United States Patent
Ikeda et al.

(10) Patent No.: US 9,776,289 B2
(45) Date of Patent: Oct. 3, 2017

(54) FLUOROCARBON RESIN COMPOSITE, COOKWARE, COOKER, ROLLER FOR OFFICE AUTOMATION EQUIPMENT, BELT FOR OFFICE AUTOMATION EQUIPMENT, AND METHOD FOR PRODUCING THEM

(71) Applicant: SUMITOMO ELECTRIC FINE POLYMER, INC., Sennan-gun, Osaka (JP)

(72) Inventors: Kazuaki Ikeda, Osaka (JP); Nobutaka Matsushita, Osaka (JP); Yoshimasa Suzuki, Osaka (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 339 days.

(21) Appl. No.: 14/089,625

(22) Filed: Nov. 25, 2013

(65) Prior Publication Data
US 2014/0077419 A1     Mar. 20, 2014

Related U.S. Application Data

(62) Division of application No. 12/665,555, filed as application No. PCT/JP2008/060660 on Jun. 11, 2008, now abandoned.

(30) Foreign Application Priority Data

Jun. 20, 2007  (JP) .................................. 2007-162671
Jul. 3, 2007   (JP) .................................. 2007-175346
Jul. 3, 2007   (JP) .................................. 2007-175348

(51) Int. Cl.
*B23P 13/00*     (2006.01)
*A47J 36/02*     (2006.01)
(Continued)

(52) U.S. Cl.
CPC .............. *B23P 13/00* (2013.01); *A47J 36/02* (2013.01); *A47J 36/025* (2013.01); *B05D 5/083* (2013.01);
(Continued)

(58) Field of Classification Search
CPC ....................................................... B23P 13/00
See application file for complete search history.

(56) References Cited

U.S. PATENT DOCUMENTS 3,432,587 A    3/1969  Shinn et al.
4,487,635 A   12/1984  Kugimiya et al.
(Continued)

FOREIGN PATENT DOCUMENTS

EP    0297561 B1    1/1989
JP    06-116423     0/1994
(Continued)

OTHER PUBLICATIONS

U.S. Office Action dated Jul. 3, 2014 that issued in U.S. Appl. No. 14/089,594 including Double Patenting Rejections on pp. 2-4.
(Continued)

*Primary Examiner* — Larry Thrower
(74) *Attorney, Agent, or Firm* — Drinker Biddle & Reath LLP

(57) ABSTRACT

A fluorocarbon resin composite includes a fluorocarbon resin layer on a base, in which a fluorocarbon resin constituting the fluorocarbon resin layer is crosslinked by electron beam irradiation, and the base has a desired shape obtained by machining. The fluorocarbon resin is composed of a tetrafluoroethylene-perfluoro(alkyl vinyl ether) copolymer, polytetrafluoroethylene, or a mixture of the tetrafluoroethylene-perfluoro(alkyl vinyl ether) copolymer and polytetrafluoroethylene. A fluorocarbon resin composite, cookware, and a roller and a belt for use in office automation equipment (Continued)

are each produced by applying an uncrosslinked fluorocarbon resin on a base, subjecting the fluorocarbon resin to electron beam irradiation in a low-oxygen atmosphere to crosslink the fluorocarbon resin while the temperature of the fluorocarbon resin is maintained at a temperature equal to or higher than the melting point of the fluorocarbon resin, and machining the base into a desired shape. There is also provided methods for producing them.

2 Claims, 15 Drawing Sheets

(51) Int. Cl.

| | | |
|---|---|---|
| *B05D 5/08* | (2006.01) | |
| *G03G 15/02* | (2006.01) | |
| *G03G 15/08* | (2006.01) | |
| *C09D 127/18* | (2006.01) | |
| *C09D 129/10* | (2006.01) | |
| *B32B 15/08* | (2006.01) | |
| *B32B 15/18* | (2006.01) | |
| *B32B 15/20* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 1/00* | (2006.01) | |
| *B05D 3/04* | (2006.01) | |
| *B05D 3/06* | (2006.01) | |

(52) U.S. Cl.
CPC ............... *B32B 1/00* (2013.01); *B32B 15/08* (2013.01); *B32B 15/18* (2013.01); *B32B 15/20* (2013.01); *B32B 27/08* (2013.01); *B32B 27/281* (2013.01); *B32B 27/30* (2013.01); *B32B 27/304* (2013.01); *B32B 27/322* (2013.01); *B32B 27/34* (2013.01); *C09D 127/18* (2013.01); *C09D 129/10* (2013.01); *G03G 15/0233* (2013.01); *G03G 15/0808* (2013.01); *B05D 3/0486* (2013.01); *B05D 3/068* (2013.01); *B05D 2701/10* (2013.01); *B32B 2307/306* (2013.01); *B32B 2307/554* (2013.01); *B32B 2307/714* (2013.01); *B32B 2413/00* (2013.01); *B32B 2439/00* (2013.01); *B32B 2509/00* (2013.01); *G03G 2215/16* (2013.01); *G03G 2215/2048* (2013.01); *Y10T 428/21* (2015.01); *Y10T 428/265* (2015.01); *Y10T 428/3154* (2015.04)

(56) References Cited

U.S. PATENT DOCUMENTS

| | | |
|---|---|---|
| 4,768,427 A | 9/1988 | Cheng |
| 5,106,682 A | 4/1992 | Matsushita et al. |
| 5,409,997 A | 4/1995 | Murphy |
| 5,985,949 A | 11/1999 | Seguchi et al. |
| 6,552,099 B2 | 4/2003 | Yamamato et al. |
| 2003/0122318 A1 | 7/2003 | Yanagiguchi et al. |
| 2005/0244660 A1 | 11/2005 | Yuasa et al. |

FOREIGN PATENT DOCUMENTS

| | | |
|---|---|---|
| JP | 54-062935 | 5/1979 |
| JP | 06-116423 | 4/1994 |
| JP | 08-118561 | 5/1996 |
| JP | 09-278907 | 10/1997 |
| JP | 11-049867 | 2/1999 |
| JP | H11-080392 A | 3/1999 |
| JP | 11-147291 | 6/1999 |
| JP | 11-172014 | 6/1999 |
| JP | H11-172065 A | 6/1999 |
| JP | H11-185533 A | 7/1999 |
| JP | 2000-186155 | 7/2000 |
| JP | 2000-186157 | 7/2000 |
| JP | 2000-290409 | 10/2000 |
| JP | 2001-042681 A | 2/2001 |
| JP | 2002-201291 | 7/2002 |
| JP | 2002-225204 | 8/2002 |
| JP | 2002-296943 A | 10/2002 |
| JP | 2002-301795 | 10/2002 |
| JP | 2003-036002 | 2/2003 |
| WO | WO 2006/059773 A1 | 6/2006 |

OTHER PUBLICATIONS

Parth, et al., "Studies on the Effect of Electron Beam Radiation on the Molecular Structure of Ultra-High Molecular Weight Polyethylene Under the Influence of Alpha-Tocopherol with Respect to its Application in Medical Implants," J Mater Sci Mater Med., Oct. 2002;13(10):917-21.
Machine translation of JP 2002-225204 A.
U.S. Office Action dated Jun. 20, 2014 that issued in U.S. Appl. No. 14/089,516 including Double Patenting Rejections on pp. 3-4.
First Office Action dated Apr. 27, 2012 from corresponding Chinese patent application No. 200880020884.X (with attached English-language translation).
Notification of Reasons for Rejection from the Japanese Patent Office dated Apr. 30, 2013 from JP patent application No. 2009-520441 with attached partial English-language translation.
Machine translation of JP11147291 to Hideki et al.

Laterally transported by conveyor

FLUOROCARBON RESIN COMPOSITE, COOKWARE, COOKER, ROLLER FOR OFFICE AUTOMATION EQUIPMENT, BELT FOR OFFICE AUTOMATION EQUIPMENT, AND METHOD FOR PRODUCING THEM

This is a divisional application of copending application Ser. No. 12/665,555, having a §371 date of Mar. 2, 2010, which is a national stage filing based on PCT International Application No. PCT/JP2008/060660, filed on Jun. 11, 2008. The copending application Ser. No. 12/665,555 is incorporated by reference herein in its entirety.

TECHNICAL FIELD

The present invention relates to a fluorocarbon resin composite, cookware and cookers including the fluorocarbon resin composite, rollers including the fluorocarbon resin composite, for example, fixing rollers, transfer rollers, pressing rollers, charging rollers, and developing rollers, for use in office automation equipment such as copiers, belts including the fluorocarbon resin composite, for example, fixing belts, belts used for fixing sections, transfer belts, and transfer fixing belts, for use in office automation equipment, and methods for producing them.

BACKGROUND ART

Fluorocarbon resins such as polytetrafluoroethylene (PTFE) have excellent nonadhesiveness, heat resistance, and chemical resistance and thus are often used as materials constituting coatings of cookers such as rice cookers and cookware such as hot plates and frying pans and topcoat layers of fixing rollers for use in office automation equipment such as copiers. The reason fluorocarbon resins such as PTFE have excellent heat resistance and chemical resistance is that in a structural formula described below, the bonding strength between C and F is the highest among organic substances (116 kcal/mol) and that fluorine atoms (F) entirely cover carbon chains to protect the C—C bonds. The reason for the excellent nonadhesiveness is a very low polarization of charges because of the symmetry of the atomic arrangement in a molecule, a low cohesive force between molecules, and a significantly low surface energy.

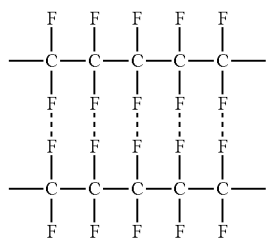

[Chem. 1]

Fluorocarbon resins have these excellent physical properties but disadvantageously have poor abrasion resistance. The reason for this is that molecules are readily detached because of a low surface energy and a low cohesive force between fluorine atoms (F—F).

To overcome this problem, currently commercially available fluorocarbon resins compensate the weakness by forming very long molecular chains having a degree of polymerization of about 10,000 to several hundred thousands, i.e., a molecular weight of about a million to tens of millions, to increase the bonding strength between fluorocarbon resins. However, it is difficult to achieve a higher molecular weight because of problems with formability and so forth (a reduction in flowability). Thus, sufficient properties are not provided. Furthermore, the adhesion of fluorocarbon resins to bases is a processing problem due to excellent nonadhesiveness. To solve this problem, in the case of using a base composed of a metal such as aluminum, it is necessary to conduct an additional step of performing etching treatment to form irregularities or forming an adhesive layer such as a primer.

In recent years, a technique in which a fluorocarbon resin, which is a representative of polymers degraded by electron beams, is crosslinked by electron beam irradiation at a temperature equal to or higher than the melting point thereof in an oxygen-free atmosphere has been developed (Patent Documents 1 and 2). It is found that to solve the problem in which the molecules are readily detached because of a low cohesive force between fluorine atoms (F—F), crosslinking a fluorocarbon resin results in a three-dimensional network structure of fluorine atoms as shown in a structural formula below, so that the polymeric chains are strongly bonded to each other, significantly improving the abrasion resistance.

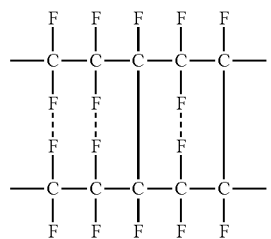

[Chem. 2]

[Patent Document 1] Japanese Patent No. 3587071
[Patent Document 2] Japanese Patent No. 3587072

DISCLOSURE OF INVENTION

Problems to be Solved by the Invention

However, in the technique described in each of Patent Documents 1 and 2, crosslinking is performed by electron beam irradiation of a fluorocarbon resin powder while the fluorocarbon resin powder is floating, thus failing to provide a fluorocarbon resin having a small particle size suitable for the formation of a fluorocarbon resin dispersion (a dispersion of a fluorocarbon resin having a particle size on the order of submicrons dispersed in water). If pulverization is performed, it is usually difficult to form a fluorocarbon resin having a particle size on the order of submicrons. Thus, the resulting fluorocarbon resin is not suitably used as a material for a dispersion commonly used for a thin film of a fluorocarbon resin. Accordingly, it is difficult to form a thin fluorocarbon resin layer (coating film) suitable for cookware using a fluorocarbon resin dispersion containing a fluorocarbon resin produced by this technique. Furthermore, it is difficult to form a topcoat film of a fixing roller and surface layers of a transfer belt and a transfer fixing belt.

For example, the fixing roller is used to fix toner transferred to recording paper. The transfer belt is used to transfer toner to recording paper. Thus, a fluorocarbon resin is preferably used as a material constituting a topcoat film of the fixing roller and a surface layer of the transfer belt because of its excellent toner releasability.

Meanwhile, a fluorocarbon resin layer disadvantageously has low abrasion resistance as described above. Thus, in the case where toner-fixing treatment and toner-transfer treatment for hundreds of thousands of recording sheets are performed using the fixing roller and the transfer belt, the fluorocarbon resin layer is worn by friction between the recording sheets and the fixing roller and between the recording sheets and the transfer belt, thereby causing problems such as a reduction in surface roughness (clogging of toner and so forth reduces toner releasability). Alternatively, a problem is caused in which the fluorocarbon resin layer is detached at portions that come into contact with both edges of each of the recording sheets. It is thus necessary to adequately ensure the thickness of the fluorocarbon resin layer, leading to difficulty in reducing the thickness of the topcoat film of the fixing roller or the surface layer of the transfer belt.

Furthermore, in the case of the fixing roller and the transfer fixing belt each having the function of fixing toner transferred to a recording sheet, they are used while being heated by a heater arranged inside thereof. In the case of a high-speed copier, a large number of recording sheets takes heat from the fixing roller and the transfer fixing belt; hence, the temperatures of the fixing roller and the transfer fixing belt tend to be reduced. Accordingly, in order not to reduce the temperatures of the fixing roller and the transfer fixing belt, it is necessary to reduce the thicknesses of the fixing roller and the transfer fixing belt for efficient conduction of heat from the heater. Alternatively, it is necessary to increase the heating temperature of the heater.

To solve the above-described problems with the fixing roller, the transfer belt, and the transfer fixing belt, it is conceivable that the addition of a filler such as a fine glass powder to a fluorocarbon resin will improve the abrasion resistance, leading to a reduction in the thickness of the fluorocarbon resin layer. However, this raises new problems in which the nonadhesiveness and the surface roughness are significantly reduced.

Meanwhile, an increase in the heating temperature of the heater disadvantageously causes the deterioration of rubber constituting an elastic layer and a further reduction in abrasion resistance due to the thermal degradation of the fluorocarbon resin layer. To impart elasticity to the belt, a soft intermediate layer composed of silicone or the like is provided. However, an increase in the thickness of the surface layer of the fluorocarbon resin reduces the flexibility of the entire belt.

Accordingly, it is a first object of the present invention to provide a fluorocarbon resin composite including a fluorocarbon resin layer having improved abrasion resistance while nonadhesiveness, which is a feature of a fluorocarbon resin, is maintained, cookware, a cooker, and methods for producing them.

It is a second object to provide a roller or belt for use in office automation equipment, the roller or belt including a fluorocarbon resin layer having improved abrasion resistance and heat resistance while nonadhesiveness, which is a feature of a fluorocarbon resin, is maintained, and a method for producing the roller or belt.

Means for Solving the Problems

The inventors have conducted intensive studies and have found that the foregoing problems are easily solved by a devised method for forming a fluorocarbon resin layer. This finding has led to the completion of the present invention.

Furthermore, the inventors have conducted intensive studies and have also found that after the application of a fluorocarbon resin, an electron beam is allowed to reach a base or intermediate layer (hereinafter, collectively referred to also as a "base and so forth"), thereby significantly improving the adhesion of the fluorocarbon resin to the base and so forth simultaneously with improvement in abrasion resistance.

Inventions of claims 1 to 7 described below are defined as an aspect common to a first aspect and a second aspect of the present invention. Inventions of claims 8 to 10 are defined as the first aspect of the present invention. Inventions of claims 11 to 21 are defined as the second aspect of the present invention. The first aspect and the second aspect are aspects that achieve the first object and the second object, respectively.

The inventions of the claims will be described below.

According to an invention described in claim 1, a fluorocarbon resin composite includes a fluorocarbon resin layer on a base, in which a fluorocarbon resin constituting the fluorocarbon resin layer is crosslinked by electron beam irradiation, and the base has a desired shape obtained by machining.

In the invention of this claim, since the fluorocarbon resin is crosslinked, it is possible to improve the abrasion resistance of the fluorocarbon resin layer while maintaining the nonadhesiveness of the fluorocarbon resin layer.

In a conventional technique for crosslinking a fluorocarbon resin by electron beam irradiation, only a fluorocarbon resin having a large particle size is obtained. It is thus difficult to form a thin fluorocarbon resin layer suitable for cookware. That is, the thin fluorocarbon resin layer is preferably formed as follows: A dispersion of fluorine particles having a particle size of 0.1 μm to several micrometers dispersed in water is used. The dispersion is applied to a target surface by, for example, a spin coating method, a dipping method, or a spraying method, dried, and baked (the particles are melted to form a fluorocarbon film). However, a large particle size of the fluorocarbon resin causes the precipitation of particles in the dispersion and the clogging of a nozzle, leading to difficulty in performing coating. Even if coating can be performed, it is difficult to obtain a smooth surface because the surface state depends on the size of the fluorocarbon particles.

In contrast, according to the invention of this claim, for example, a fluorocarbon resin layer is formed on a substantially flat base using a dispersion of usual uncrosslinked fluorocarbon particles having a small particle size. Thus, it is possible to easily form a thin fluorocarbon resin layer suitable for cookware.

Conventionally, according to a common method for forming a fluorocarbon resin layer in the production of cookware, it is difficult to subject the entire fluorocarbon resin layer to electron beam irradiation.

That is, as a method for forming a coating film for use in cookware, a method is generally employed in which after a base is pressed into a predetermined shape, the fluorocarbon resin is applied by, for example, spraying and then baked (hereinafter, a method in which a fluorocarbon resin is applied after machining is referred to as an "after-coat method"). In the case where cookware produced by the after-coat method is subjected to electron beam irradiation to crosslink the fluorocarbon resin in order to improve abrasion resistance, for example, it is difficult to simultaneously subject a fluorocarbon resin layer arranged on a horizontal inner wall of a bottom and a substantially vertical inner surface of a side wall of a rice cooker or a frying pan to electron beam irradiation.

That is, for the fluorocarbon resin layer located at a surface perpendicular to the direction of electron beam irradiation, the entire fluorocarbon resin can be subjected to electron beam irradiation because the thickness direction corresponds to the transmission direction of electron beams. However, for the fluorocarbon resin layer located at a substantially vertical surface obtained by machining, i.e., a surface parallel to the direction of electron beam irradiation, only part of the fluorocarbon resin (portion facing an electron beam irradiation apparatus) is subjected to electron beam irradiation because the thickness direction does not correspond to the transmission direction of electron beams.

In contrast, according to the invention of this claim, after the formation of the fluorocarbon resin layer on the base, electron beam irradiation is performed before the base is machined (in this way, a method of applying the fluorocarbon resin before machining is referred to as a "precoat method").

As described above, since the base is substantially flat, the entire surface of the fluorocarbon resin layer can be located at a position perpendicular to the irradiation direction of electron beams. That is, it is possible to subject the entire fluorocarbon resin layer to electron beam irradiation because the thickness direction of the entire fluorocarbon resin layer corresponds to the transmission direction of electron beams, thereby resulting in cookware including the fluorocarbon resin layer having excellent abrasion resistance.

Furthermore, it is possible to efficiently produce cookware because crosslinking is rapidly performed by electron beam irradiation, which is a simple method. Note that a metal base is mainly used as the base.

According to an invention described in claim 2, in the fluorocarbon resin composite according to Claim 1, the fluorocarbon resin is composed of one selected from a tetrafluoroethylene-perfluoro(alkyl vinyl ether) copolymer (PFA), polytetrafluoroethylene (PTFE), and a fluorinated ethylene-propylene copolymer (FEP), or a mixture of two or three compounds selected from PFA, PTFE, and FEP.

In the invention of this claim, the fluorocarbon resin is composed of one selected from the tetrafluoroethylene-perfluoro(alkyl vinyl ether) copolymer (PFA), polytetrafluoroethylene (PTFE), and the fluorinated ethylene-propylene copolymer (FEP), or a mixture of two or three compounds selected from these compounds. Thus, a thin film of the fluorocarbon resin having excellent heat resistance and resistance to stress cracking is obtained.

According to an invention described in claim 3, in the fluorocarbon resin composite according to Claim 1 or 2, an electron beam during the electron beam irradiation reaches the base through the fluorocarbon resin layer.

Like the invention of this claim, the crosslinking of the uncrosslinked fluorocarbon resin on the base by electron beam irradiation in which an electron beam reaches the base through the fluorocarbon resin layer significantly improves the adhesive strength between the base and the fluorocarbon resin layer compared with the case where an electron beam does not reach the base. The reason for the improvement in the adhesion to the base is probably as follows: Electron beam irradiation causes cleavage of a main chain or a side chain. In particular, when the temperature of the fluorocarbon resin is heated to a temperature equal to or higher than its melting point, active radicals are generated. The resulting radicals are bonded to the base because there is no substance, such as oxygen, which is readily bonded to the radicals. For example, the electron beam is allowed to reach the base by adjusting an acceleration voltage during electron beam irradiation in response to the thickness of the fluorocarbon resin layer.

According to an invention described in claim 4, in the fluorocarbon resin composite according to any one of Claims 1 to 3, the fluorocarbon resin layer has a thickness of 70 μm or less.

For example, in a rice cooker, a frying pan, a pot, or the like, generally, the fluorocarbon resin layer needs to have a thickness of about 70 to 120 μm. However, an increase in the thickness of the fluorocarbon resin layer can form a crack on baking the fluorocarbon resin layer. Frequently, multiple applications of the fluorocarbon resin result in a multilayer coating. This leads to increases in machining cost and the cost of materials.

According to the invention of this claim, crosslinking by electron beam irradiation improves the abrasion resistance of the fluorocarbon resin layer, so that the thickness of the fluorocarbon resin layer can be reduced to 70 μm or less while the abrasion resistance is maintained. As a result, the machining cost and the cost of materials can be reduced by providing a single-layer coating or a reduction in the number of layers of a multilayer coating. From the viewpoint of thermal conductivity and productivity, the fluorocarbon resin layer preferably has a thickness of 30 μm or less and more preferably 10 μm or less. In such a thin film, the abrasion resistance is ensured.

The distance in which an electron beam transmits the fluorocarbon resin layer is determined by the acceleration voltage of the electron beam and the specific gravity of the fluorocarbon resin. The specific gravity is intrinsic to the fluorocarbon resin. When the thickness of the fluorocarbon resin layer to be subjected to crosslinking treatment is determined, an acceleration voltage needed is determined. The distance in which an electron beam transmits the fluorocarbon resin is increased with increasing acceleration voltage. That is, an increase in the thickness of the fluorocarbon resin layer increases the acceleration voltage required to crosslink the entire fluorocarbon resin layer, so that it is necessary to use a large-sized expensive electron beam irradiation apparatus.

According to the invention of this claim, crosslinking by electron beam irradiation improves the abrasion resistance of the fluorocarbon resin layer. The thickness of the fluorocarbon resin layer can be reduced to 70 μm or less, preferably 30 μm or less, and more preferably 10 μm or less while the abrasion resistance is maintained. It is thus possible to perform crosslinking with an ultrasmall, inexpensive general-purpose electron beam irradiation apparatus with an acceleration voltage of 60 kV.

According to an invention described in claim 5, in the fluorocarbon resin composite according to any one of Claims 1 to 4, the amount of the electron beam irradiation is in the range of 1 kGy to 500 kGy.

In the invention of this claim, the amount of the electron beam irradiation is in the range of 1 kGy to 500 kGy, thereby assuredly crosslinking the fluorocarbon resin and suppressing cleavage of polymeric chains of the fluorocarbon resin due to excessive irradiation.

An amount of the electron beam irradiation of 50 kGy or more results in an increase in crosslink density, improving the abrasion resistance. An amount of the electron beam irradiation of 300 kGy or less provides the flexibility of the film, suppressing the occurrence of cracking during processing such as pressing. An amount of the electron beam irradiation exceeding 300 kGy causes degradation of the polymer, reducing the abrasion resistance. Thus, the amount of the electron beam irradiation is preferably in the range of 50 kGy to 300 kGy.

According to an invention described in claim 6, in the fluorocarbon resin composite according to any one of Claims 1 to 5, the base is composed of aluminum, an aluminum alloy, or stainless steel.

In the invention of this claim, the base is composed of aluminum, an aluminum alloy, or stainless steel. In this case, the base is easily subjected to machining such as pressing and spinning and serves as a material for a lightweight cookware.

According to an invention described in claim 7, in the fluorocarbon resin composite according to Claim 6, the fluorocarbon resin layer is formed on the non-surface-treated base, and in a cross-cut test (JIS-K-5400, 1998 edition), the fluorocarbon resin layer is not detached after 100 repetitions of a peeling operation using an adhesive tape.

In the invention of this claim, the fluorocarbon resin layer having a strong adhesion to the base is obtained without performing surface treatment of the base. It is thus possible to provide the fluorocarbon resin composite that is easily produced.

Note that "not detached" described above indicates that the fluorocarbon resin composite is classified into class 10 specified by JIS-K-5400 (1998 edition).

According to an invention described in claim 8, cookware includes the fluorocarbon resin composite according to any one of Claims 1 to 7.

Fluorocarbon resins have excellent nonadhesiveness and the advantage that food does not easily adhere to a rice cooker, a frying pan, or the like. Disadvantageously, the adhesion strength between the fluorocarbon resin and the base is low. To solve the problem, a technique for etching a surface of a base (Japanese Patent No. 1239856) and the use of a primer layer (adhesive layer) are reported. However, they are not sufficient, causing an increase in cost.

In contrast, the cookware according to the invention of this claim is composed of the fluorocarbon resin composite. Unlike conventional cookware, the cookware has excellent adhesive strength between the base and the fluorocarbon resin layer and leads to low cost.

According to an invention described in claim 9, a cooker includes the cookware according to Claim 8.

In the invention of this claim, the cooker advantageously has excellent properties described in claim 8.

According to an invention described in claim 10, a method for producing a fluorocarbon resin composite includes the steps of applying an uncrosslinked fluorocarbon resin onto a base, heating the fluorocarbon resin to a temperature equal to or higher than the melting point of the fluorocarbon resin, subjecting the fluorocarbon resin to electron beam irradiation in a low-oxygen atmosphere to crosslink the fluorocarbon resin, and machining the base in such a manner that the base has a desired shape.

In the invention of this claim, after the uncrosslinked fluorocarbon resin is applied onto a base, the fluorocarbon resin is heated to a temperature equal to or higher than the melting point of the fluorocarbon resin, and then the fluorocarbon resin is subjected to electron beam irradiation in a low-oxygen atmosphere to crosslink the fluorocarbon resin. Thus, the thin crosslinked fluorocarbon resin film on the base, which has been difficult to form in the past, is easily formed. The uncrosslinked fluorocarbon resin can be used as a powder having a small particle size. Thus, the resin can be used as a raw material for a fluorocarbon resin dispersion. Since a crosslinked fluorocarbon resin having a large particle size is not used, a thin film can be formed.

For example, a fluorocarbon resin dispersion (a dispersion of the uncrosslinked fluorocarbon resin dispersed in water) is applied by spin coating to a surface of the plate-like base to form a thin film of the fluorocarbon resin. Spin coating is a method as described below. The fluorocarbon resin dispersion is dropped on the middle portion of the base while the base is being rotated. The dispersion is spread by a centrifugal force, so that the thin fluorocarbon resin film having a uniform thickness is formed on the surface of the base. Next, the fluorocarbon resin is baked by heating. The resulting fluorocarbon resin is heated to a temperature equal to or higher than its melting point. The fluorocarbon resin is crosslinked by electron beam irradiation in a low-oxygen atmosphere. After cooling the base and the fluorocarbon resin, the base is machined into a desired shape. Machining indicates that an inner pot of a rice cooker or a frying pan is formed by pressing or spinning. In this way, it is possible to easily produce cookware having improved abrasion resistance and adhesive strength while nonadhesiveness, which is a feature of a fluorocarbon resin, is maintained. To increase the crosslink density, the oxygen concentration in the low-oxygen atmosphere is preferably set 1000 ppm or less and more preferably 500 ppm or less. Furthermore, an excessively small oxygen concentration is not preferred. Specifically, a nitrogen gas atmosphere can be preferably used.

According to an invention described in claim 11, a roller or a belt for use in office automation equipment includes a fluorocarbon resin layer on a circular base, in which the fluorocarbon resin layer is crosslinked by electron beam irradiation.

In the invention of this claim, the fluorocarbon resin is crosslinked by electron beam irradiation. The abrasion resistance of the fluorocarbon resin layer is improved while the nonadhesiveness of the fluorocarbon resin is maintained, reducing the thickness of the fluorocarbon resin layer. Thus, in the fixing roller or a transfer fixing belt, heat from a heater arranged inside thereof is efficiently conducted. In the case where the fluorocarbon resin layer has a thickness of, for example, 10 µm, 40% of heat from the heater arranged in the fixing roller or the transfer fixing belt is lost. However, in the case where the thickness is 5 µm, only 20% of heat is lost. It is thus possible to improve a print speed without increasing the heating temperature of the heater.

An increase in the temperature of the heater causes thermal degradation, reducing the abrasion resistance. However, in the invention of this claim, the fluorocarbon resin is crosslinked by electron beam irradiation, thus improving the abrasion resistance of the fluorocarbon resin layer because the crosslinking of the fluorocarbon resin eliminates the melting point, i.e., the fluorocarbon resin is not melt. Furthermore, in the present invention, the base is bonded to the fluorocarbon resin by electron beam irradiation, thus eliminating an adhesive layer (primer); hence, it is possible to significantly increase the thermal conductivity of a roller or a belt for use in office automation equipment.

The foregoing technique can be applied to another roller or belt for use in office automation equipment. Examples of the roller for use in office automation equipment include a fixing roller, a transfer roller, a pressing roller, a charging roller, and developing roller. Examples of the belt for use in office automation equipment include a transfer belt, a transfer fixing belt, and a belt used for a fixing section like the fixing belt.

According to an invention described in claim 12, in the roller or the belt for use in office automation equipment according to Claim 11, the fluorocarbon resin layer is composed of one selected from a tetrafluoroethylene-perfluoro(alkyl vinyl ether) copolymer (PFA), polytetrafluoroethylene (PTFE), and a fluorinated ethylene-propylene copolymer (FEP), or a mixture of two or three compounds selected from PFA, PTFE, and FEP.

In the invention of this claim, the fluorocarbon resin is composed of one selected from PFA, PTFE, and FEP, or a mixture of two or three compounds selected from these compounds. Thus, a thin film of the fluorocarbon resin having excellent heat resistance and resistance to stress cracking is obtained.

According to an invention described in claim 13, in the roller or the belt for use in office automation equipment according to Claim 11 or 12, an electron beam during the electron beam irradiation reaches the circular base through the fluorocarbon resin layer.

As described above, the crosslinking of the uncrosslinked fluorocarbon resin on the base by electron beam irradiation in which an electron beam reaches the base through the fluorocarbon resin layer significantly improves the adhesive strength between the base and the fluorocarbon resin layer compared with the case where an electron beam does not reach the base. According to the invention of this claim, it is thus possible to provide the roller or the belt, for use in office automation equipment, in which the base and the fluorocarbon resin layer are strongly bonded to each other.

According to an invention described in claim 14, in the roller or the belt for use in office automation equipment according to any one of Claims 11 to 13, the fluorocarbon resin layer has a thickness of 20 μm or less.

In the invention of this claim, the abrasion resistance of the fluorocarbon resin layer is improved by crosslinking using electron beam irradiation. Thus, the thickness of the fluorocarbon resin layer can be reduced to 20 μm or less, preferably 10 μm or less, more preferably 3 μm or less for a roller, and 7 μm or less for a belt while the abrasion resistance is maintained. Thus, it is possible to increase the thermal conductivity of the roller or the transfer fixing belt. The temperature of the heater need not be increased, thus suppressing the thermal degradation of the fluorocarbon resin layer. Furthermore, it is possible to reduce the machining cost and the cost of materials. Moreover, in the case where the thickness is 20 μm or less, it is possible to perform crosslinking with an ultrasmall, inexpensive general-purpose electron beam irradiation apparatus with an acceleration voltage of 60 kV.

According to an invention described in claim 15, in the roller or the belt for use in office automation equipment according to any one of Claims 11 to 14, the amount of the electron beam irradiation is in the range of 1 kGy to 500 kGy.

In the invention of this claim, the amount of the electron beam irradiation is in the range of 1 kGy to 500 kGy, thus assuredly crosslinking the fluorocarbon resin.

According to an invention described in claim 16, in the roller or the belt for use in office automation equipment according to any one of Claims 11 to 15, the circular base is composed of a heat-resistant resin or a metal.

In the invention of this claim, the circular base is composed of a heat-resistant resin or a metal, thus providing the roller or the belt, for use in office automation equipment, having excellent heat resistance and mechanical strength. Examples of the heat-resistant resin that can be used include polyimide resins and polyamide-imide resins. Examples of the metal that can be used include stainless steel and aluminum.

According to an invention described in claim 17, in the roller or the belt for use in office automation equipment according to any one of Claims 11 to 16, the fluorocarbon resin layer is formed on the non-surface-treated base, and the fluorocarbon resin layer has an adhesive strength of 0.5 Kg/1.5 cm or more in a peeling test.

In the invention of this claim, it is possible to achieve the adhesive strength of the fluorocarbon resin layer to 0.5 Kg/1.5 cm or more and preferably 0.8 Kg/1.5 cm or more by crosslinking using electron beam irradiation. As a result, the fluorocarbon resin layer having a strong adhesion to the base is provided without performing adhesive treatment, e.g., the use of a primer on a surface of the base.

According to an invention described in claim 18, in the roller or the belt for use in office automation equipment according to any one of Claims 11 to 17, an intermediate layer is arranged between the circular base and the fluorocarbon resin layer.

In the invention of this claim, the formation of the intermediate layer between the base and the fluorocarbon resin layer results in the roller or the belt, for use in office automation equipment, capable of corresponding to requirement specifications of various users in addition to the effects described above. As the intermediate layer, for example, an elastic material such as silicone rubber is used.

According to an invention described in claim 19, a method for producing a roller or a belt for use in office automation equipment includes the steps of applying an uncrosslinked fluorocarbon resin onto a circular base, heating the fluorocarbon resin to a temperature equal to or higher than the melting point of the fluorocarbon resin, and subjecting the fluorocarbon resin to electron beam irradiation in a low-oxygen atmosphere to crosslink the fluorocarbon resin.

In the invention of this claim, after the application of the uncrosslinked fluorocarbon resin onto the base, the fluorocarbon resin is subjected to electron beam irradiation in a low-oxygen atmosphere to crosslink the fluorocarbon resin while the temperature of the fluorocarbon resin is maintained at a temperature equal to or higher than its melting point. Thus, the thin crosslinked fluorocarbon resin film on the base, which has been difficult to form in the past, is easily formed.

The uncrosslinked fluorocarbon resin can be used as a powder having a small particle size. Thus, a dispersion method or the like can be employed. Since a crosslinked fluorocarbon resin having a large particle size is not used, a thin film can be formed. As a result, the thermal conductivity can be improved while the nonadhesiveness, which is a feature of a fluorocarbon resin, is maintained. Furthermore, it is possible to easily produce the roller or the belt, for use in office automation equipment, having improved abrasion resistance and heat resistance. As the low-oxygen atmosphere, a nitrogen gas atmosphere or the like is preferred.

Moreover, after the formation of the uncrosslinked fluorocarbon resin on the base, the resin is crosslinked by electron beam irradiation, thus leading to a significantly strong adhesion between the fluorocarbon resin and the base and eliminating the need for an adhesive layer (primer). The reason for the improvement in the adhesion to the base is probably as follows: Electron beam irradiation causes cleavage of a main chain or a side chain. Active radicals are generated because of a high temperature. The resulting radicals are bonded to the base because there is no substance, such as oxygen, which is readily bonded to the radicals.

According to an invention described in claim 20, a method for producing a roller or a belt for use in office automation equipment includes the steps of placing a die (outlet) of an extruder in a low-oxygen atmosphere, extruding an uncrosslinked fluorocarbon resin from the die of the extruder onto the circular base, and subjecting the fluorocarbon resin to electron beam irradiation in the low-oxygen atmosphere to crosslink the fluorocarbon resin before the temperature of the fluorocarbon resin is decreased to a temperature equal to or lower than the melting point of the fluorocarbon resin.

In the invention of this claim, the thin film of the fluorocarbon resin is formed on the circular base by extrusion suitable for mass production. Furthermore, electron beam irradiation is performed before the temperature of the molten fluorocarbon resin is decreased to a temperature equal to or lower than the melting point of the fluorocarbon resin. Thus, the roller or the belt for use in office automation equipment can be efficiently produced at low cost.

According to an invention described in claim 21, the method for producing a roller or a belt for use in office automation equipment according to Claim 19 or 20 further includes after the uncrosslinked fluorocarbon resin is heated to a temperature equal to or higher than the melting point of the fluorocarbon resin and then subjected to electron beam irradiation in a low-oxygen atmosphere to crosslink the fluorocarbon resin, performing rapid cooling before the temperature of a layer located below the fluorocarbon resin reaches the decomposition temperature of the layer.

As described above, the uncrosslinked fluorocarbon resin is heated to a temperature equal to or higher than its melting point and then subjected to electron beam irradiation in a low-oxygen atmosphere, thereby easily and assuredly crosslinking the fluorocarbon resin. The temperature of the layer located below the fluorocarbon resin is increased by heat from the fluorocarbon resin layer. However, rapid cooling is performed before the temperature reaches the decomposition temperature of the layer, so that the properties of the lower layer are not reduced. Furthermore, if the fluorocarbon resin is rapidly cooled, the crystallization of the fluorocarbon resin does not easily occur, thus improving the flex resistance of the fluorocarbon resin layer.

That is, the uncrosslinked fluorocarbon resin is applied to an inner peripheral surface of a ring-shaped die (cylinder) by a thin-film formation method such as a dispersion method. For example, silicone rubber is applied to the inner peripheral surface of the circular fluorocarbon resin layer to form the intermediate layer. Next, for example, a polyimide resin serving as a base is applied to the inner peripheral surface of the intermediate layer to form a circular base. Then the circular base, the intermediate layer, and the fluorocarbon resin layer are pulled out from the die. The uncrosslinked fluorocarbon resin surface layer is heated to a temperature equal to or higher than its melting point, subjected to electron beam irradiation in a low-oxygen atmosphere, and rapidly cooled before the temperature of the intermediate layer located below the fluorocarbon resin layer reaches the decomposition temperature, thereby completing the belt for use in office automation equipment.

When the electron beam irradiation is performed, spiral irradiation is preferred. A small electron beam irradiation apparatus is characterized in that the amount of electron beam irradiation in the middle of an irradiation spot is large and the amount of electron beam irradiation in the periphery is small. It is thus difficult to uniformly irradiate a surface of the fluorocarbon resin layer with electron beams by simple electron beam irradiation. Accordingly, the surface of the fluorocarbon resin layer is uniformly subjected to electron beam irradiation while the circular base provided with the fluorocarbon resin layer, which is a target irradiated, on its outer peripheral surface is being rotated and while the electron beam irradiation apparatus arranged outside the base is being translated in the axial direction of the circular base (that is, spiral irradiation).

Advantages

According to the first aspect of the present invention, the fluorocarbon resin layer on the base is crosslinked by electron beam irradiation and machined into a desired shape. Thus, it is possible to provide the fluorocarbon resin composite, the cookware, or the cooker including the thin film of the fluorocarbon resin having excellent abrasion resistance while nonadhesiveness, which is a feature of a fluorocarbon resin, is maintained.

According to the second aspect of the present invention, the uncrosslinked fluorocarbon resin is formed on the base, and the fluorocarbon resin is crosslinked by electron beam irradiation. Thus, it is possible to provide the roller or the belt, for use in office automation equipment, including the thin film of the fluorocarbon resin having excellent abrasion resistance and heat resistance while nonadhesiveness, which is a feature of a fluorocarbon resin, is maintained.

Figure 1:
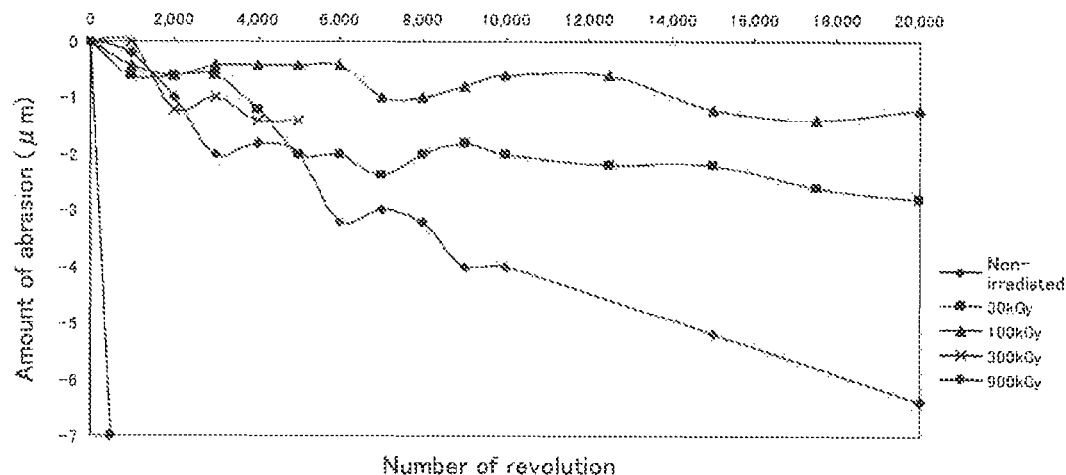
FIG. 1 is a graph showing the evaluation results of abrasion properties of fluorocarbon resin layers used in the present invention.

REFERENCE NUMERALS 1 base
2 fluorocarbon resin layer
3 stainless steel
20, 38, 53 electron beam irradiation apparatus
21 electron-beam tube
31 fluorocarbon resin composite
32 aluminum base
33 chamber
34 partition wall
35 hot plate
36 opening
37 titanium foil
39 cut penetrating to base
41, 71 circular base
51, 61 die (outlet) of extruder
52, 62 opening
63 hole
72 intermediate layer

BEST MODE FOR CARRYING OUT THE INVENTION

The present invention will be described below on the basis of the best mode for carrying out the invention. The present invention is not limited to embodiments described below. Various modifications can be made to the following embodiments within the scope identical to the present invention and the scope of its equivalence.

1. Evaluation Example (Fluorocarbon Resin and Production and Evaluation of Fluorocarbon Resin Composite Including Fluorocarbon Resin)
i. Basic Abrasion Properties To check the effect of a crosslinked fluorocarbon resin, a thin fluorocarbon resin film formed on a plate was crosslinked by electron beam irradiation, and then adhesion and a change in abrasion properties were evaluated.

A sample was produced as follows: A fluorocarbon resin dispersion (PFA dispersion 950 HP, manufactured by Du Pont-Mitsui Fluorochemicals) was applied by dipping on a 5-mm-thick aluminum plate and baked at 380° C. to form a film with a thickness of 5 μm. An irradiation unit equipped with a chamber and a hot plate (min-EB, output: 30 kV, manufactured by Ushio Inc.) was prepared. The aluminum plate coated with the fluorocarbon resin was placed on the hot plate at a temperature of 400° C. under a nitrogen atmosphere and subjected to electron beam irradiation. Five different amounts of irradiation were used: 30 kGy, 100 kGy, 300 kGy, 900 kGy, and only heating to 400° C. (not irradiated).

Abrasion properties were evaluated by the Taber's abrasion resistance test. The Taber's abrasion resistance test is performed by placing Scotch-Brite (registered trademark) (#3000) and a 2-kg weight on the irradiated sample, rotating Scotch-Brite (registered trademark) at 500 rpm, measuring a reduction in the thickness of the PFA film due to friction applied by Scotch-Brite (registered trademark) with respect to the number of revolutions.

FIG. 1 shows the evaluation results of the abrasion properties. In FIG. 1, the horizontal axis of the graph indicates the total number of revolutions of Scotch-Brite (registered trademark). The vertical axis indicates the reduction in the thickness of the sample. The results demonstrated as follows: The amount of abrasion was reduced as the amount of irradiation was increased from 30 kGy to 100 kGy compared with a nonirradiated sample and that the abrasion resistance was significantly improved. At 300 kGy, the reduction in thickness was increased. At 900 kGy, the sample was immediately abraded. At 300 kGy and 900 kGy, the fluorocarbon resin began to degrade, which revealed that the abrasion resistance was reduced. Thus, in the case where this fluorocarbon resin is used at the temperature, an amount of irradiation of about 100 kGy is appropriate.

Figure 2:
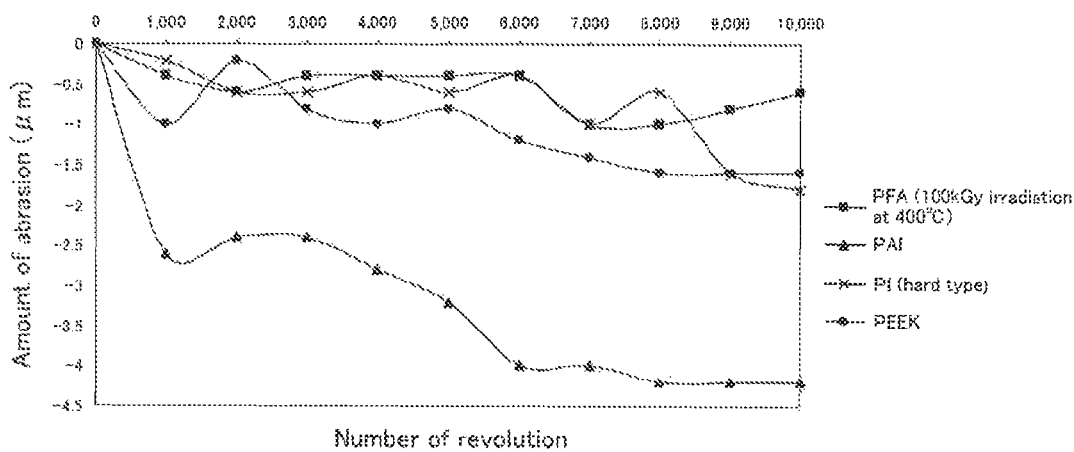
FIG. 2 is a graph showing the evaluation results of abrasion properties of fluorocarbon resin layers used in the present invention.

Next, comparisons were made between crosslinked PFA and other materials. As other materials, three super engineering plastics, which are hard and excellent in abrasion resistance, were used. Specifically, polyamide-imide (PAI) (Vylomax HR-16NN, manufactured by Toyobo Co., Ltd.), polyimide (PI) (U-Varnish-S, manufactured by Ube Industries, Ltd.), and polyetheretherketone (PEEK) (PEEK-COATING, manufactured by Okitsumo Incorporated) were used. FIG. 2 shows the evaluation results. The results demonstrated that the crosslinked PFA had abrasion properties superior than those of super engineering plastics, such as PAI, PI, and PEEK.

ii. Test of Adhesion Properties

Next, an experiment to improve the adhesion of a fluorocarbon resin to a base by electron beam irradiation was performed.

A sample was produced as follows: A fluorocarbon resin dispersion (PFA dispersion 950 HP, manufactured by Du Pont-Mitsui Fluorochemicals) was applied by dipping onto a 5-mm-thick aluminum plate and polyimide (PI) (U-Varnish-S, manufactured by Ube Industries, Ltd.) and baked at 380° C., thereby forming films each having a thickness of 5 μm. The resulting films were subjected to electron beam irradiation with an irradiation unit equipped with a chamber and a hot plate (min-EB, output: 30 kV, manufactured by Ushio Inc.) under a nitrogen atmosphere at a hot-plate temperature of 400° C. and an amount of electron beam irradiation of 100 kGy.

The evaluation was made by a detachment test, what is called a cross-cut test, according to JIS-K-5400 (1998 edition). The cross-cut test is as follows: Cuts are made in a surface of the sample so as to penetrate to the plate, thereby forming a grid of 100 squares each measuring about 1×1 mm. An operation in which a tape is adhered to the grid and then removed is repeated. This test is to determine how many repetitions of the operation are necessary to detach the sample. The test results demonstrated that all squares of nonirradiated PFA on the aluminum plate were detached after several repetitions of the operation and that none of the squares of each of the irradiated PFA films on the aluminum plate and PI was detached even after 100 repetitions of the operation. That is, according to the foregoing standard, the evaluation of the detachment state is based on classes 0 to 10. The samples were classified into class 10 (each cut is thin, the edges of the cuts are smooth, none of the squares of the grid is detached, and no flake is detached at the intersections of the cuts). Thus, it was found that the irradiation of the fluorocarbon resin with an electron beam at a high temperature under an oxygen-free atmosphere significantly increases adhesion to the base.

Next, the evaluation was made by a peeling test, in which a sheet composed of a fluorinated ethylene-propylene copolymer (FEP) is bonded to a fluorocarbon film on a base and a force necessary to peel the film is measured. Table I shows the test results. In all test pieces, although the evaluation was not completed because detachment occurred at the interface between the FEP sheet and the sample, it was found that each of the samples had an adhesive strength as high as 1.7 kg/1.5 cm or more.

Note that in the case where a primer (adhesive) is not used or etching treatment (surface treatment of the base) is not performed, the adhesive strength determined by the peeling test is an unmeasurable level (substantially zero).

TABLE I

| Base | Amount of irradiation (kGy) | Adhesive strength (kg/1.5 cm) | | | Remarks |
|---|---|---|---|---|---|
| | | 1 | 2 | Average | |
| Aluminum | 30 | 2.24 | 1.63 | 1.93 | Detachment at interface between fluorocarbon film and FEP sheet |
| Aluminum | 100 | 1.98 | 1.53 | 1.76 | Detachment at interface between fluorocarbon film and FEP sheet |
| Aluminum | 300 | 1.76 | 1.7 | 1.73 | Detachment at interface between fluorocarbon film and FEP sheet |
| Aluminum | 900 | 2.3 | 2.51 | 2.41 | Detachment at interface between fluorocarbon film and FEP sheet |
| Polyimide | 100 | 1.5 | 0.61 | 1.05 | Detachment at interface between polyimide and fluorocarbon film |

2. First Embodiment

This embodiment is an embodiment according to the first aspect and relates to cookware.
(Production of Cookware)

Figure 3:
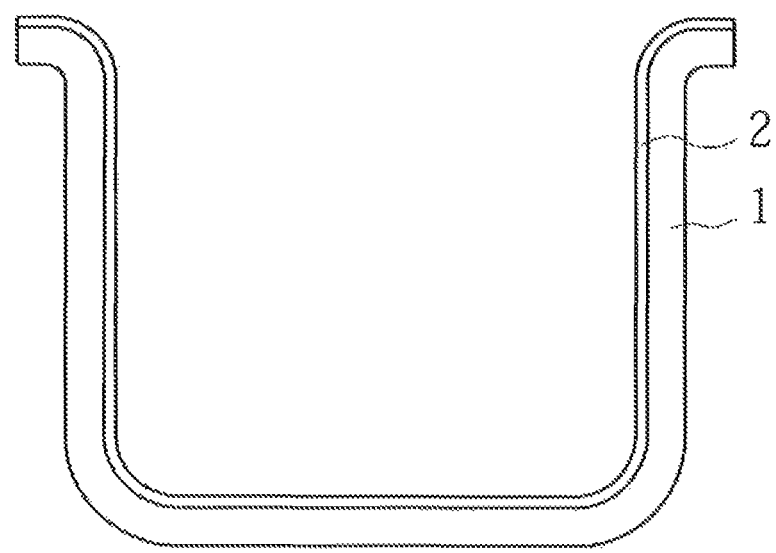
FIG. 3 is a conceptual cross-sectional view showing cookware according to an embodiment of the present invention.

FIG. 3 is a conceptual drawing of an inner pot of a rice cooker as an example of cookware. In FIG. 3, reference numeral 1 denotes a base, and reference numeral 2 denotes a thin film-like fluorocarbon resin on the base 1.

The base 1 includes a bottom and a side. Examples of a material for the base 1 that can be used include metals such as stainless steel, aluminum, and aluminum alloys.

The fluorocarbon resin layer 2 is arranged on a horizontal inner wall of the bottom and a substantially vertical inner wall of the side, has a thickness of 15 μm, and is crosslinked by electron beam irradiation. The fluorocarbon resin layer 2 is preferably formed of PFA (PFA dispersion 950 HP, manufactured by Du Pont-Mitsui Fluorochemicals). The PFA is composed of a thermoplastic fluorocarbon resin and has a solid content of 33% and a particle size of approximately several tenths of a micrometer; hence, the PFA is suitable for the formation of a thin film using, for example, a fluorocarbon resin dispersion.

Figure 4:
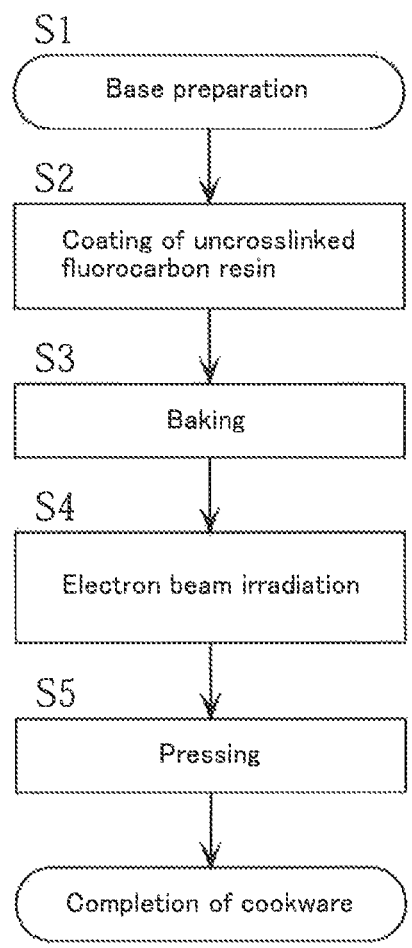
FIG. 4 is a flow chart illustrating a procedure of producing cookware according to an embodiment of the present invention.

The inner pot having the structure described above is produced in accordance with a flow chart of a production procedure shown in FIG. 4.

Figure 5:
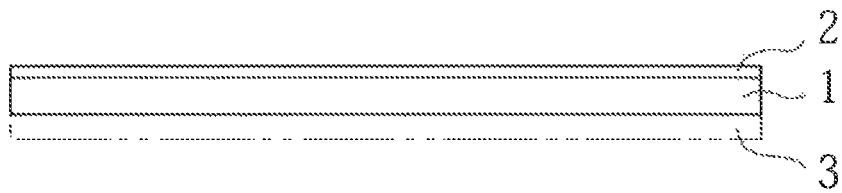
FIG. 5 is a conceptual cross-sectional view showing a step according to an example of the present invention.

First, a flat-shaped base is prepared. As shown in FIG. 5, the flat-shaped base 1 composed of an aluminum alloy (Al—Mn-based, JIS 3003, 3004, or 3005) and having a thickness of about 0.6 to about 3.0 mm is prepared. In an induction heating (IH) cooker, a stainless steel sheet 3 is arranged on the back side of the base 1, in some cases, as indicated by a chain double-dashed line in FIG. 5.

In step S2, a dispersion of a fine powder composed of an uncrosslinked fluorocarbon resin (PFA) dispersed in water is applied to the upper surface of the base 1 by spin coating to form the thin fluorocarbon resin layer 2.

Figure 6:
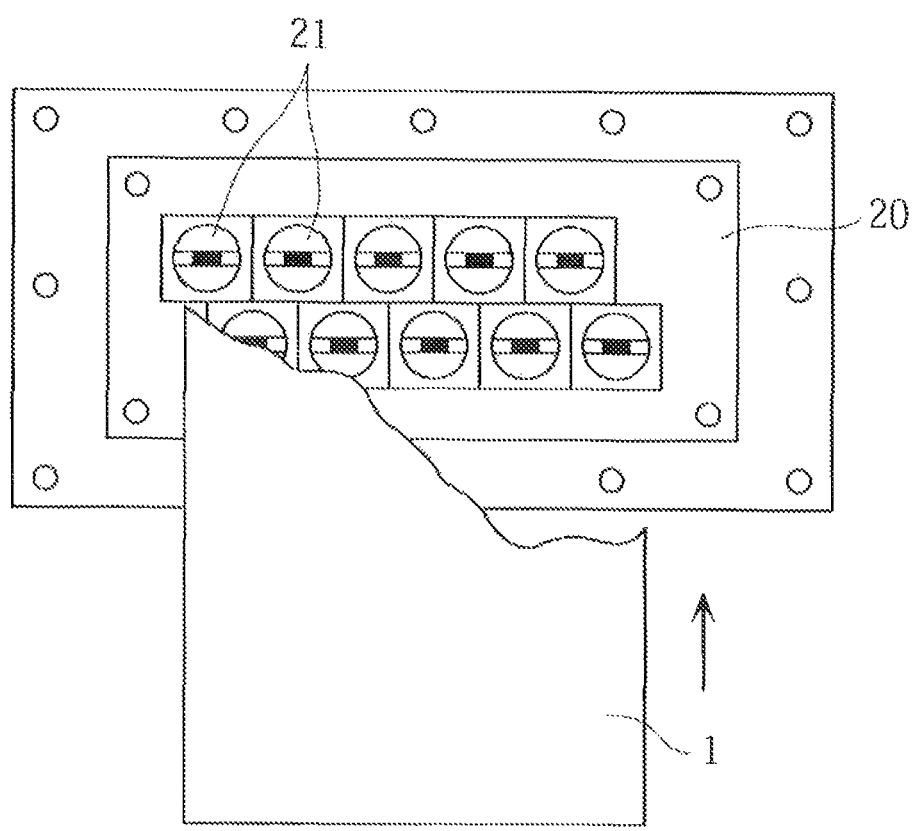
FIG. 6 is a conceptual drawing illustrating a method for irradiating a fluorocarbon resin with electron beams.

In step S3, the base 1 is placed in a temperature-controlled oven and baked at 380° C. to 420° C. for 10 to 20 minutes. In step S4, electron beam irradiation is performed in a nitrogen gas atmosphere to crosslink the resin while the fluorocarbon resin layer 2 is melted at a temperature equal to or higher than the melting point of the resin. That is, as shown in FIG. 6, the base 1 that has the fluorocarbon resin layer 2 facing down is transported above an electron beam irradiation apparatus 20 in the direction indicated by an arrow, so that the entire fluorocarbon resin layer 2 is uniformly subjected to electron beam irradiation. To sufficiently crosslink the fluorocarbon resin layer 2, the amount of electron beam irradiation is preferably about 100 kGy. The irradiation unit (min-EB, manufactured by Ushio Inc.) including 10-electron-beam tubes 21 arranged in a staggered configuration is used as the electron beam irradiation apparatus 20 because it is versatile, inexpensive, and compact.

According to the present invention, the fluorocarbon resin layer has a small thickness. Thus, a single-layer coating can be formed. Furthermore, electron beams reach the base with the foregoing general-purpose electron beam irradiation apparatus, providing a product having the strong adhesion of the fluorocarbon resin layer to the base.

In step S5, the base 1 is subjected to pressing or spinning so as to have a desired shape.

In this way, the inner pot provided with the crosslinked thin fluorocarbon resin layer 2 formed on the base 1 is completed by the production process suitable for mass production. The abrasion resistance of the fluorocarbon resin layer 2 of the resulting inner pot is evaluated by the Taber's abrasion resistance test. Furthermore, the adhesive strength between the base and the fluorocarbon resin layer is evaluated by the cross-cut test (JIS-K-5400, 1998 edition). In both cases, whether the results meet predetermined criteria is checked.

A detailed description will be given below on the basis on an example.

EXAMPLE

In this example, a fluorocarbon resin composite including an aluminum base was subjected to pressing with a press actually used for producing an inner pot of a rice cooker in order to check whether the fluorocarbon resin composite was able to withstand pressing and whether the fluorocarbon resin composite did not cause a problem.

(1) Production of Fluorocarbon Resin Composite
i. Coating of Fluorocarbon Resin on Base Two different fluorocarbon resins, i.e., a PTFE dispersion (D1-F, manufactured by Daikin Industries, Ltd.) and a PFA dispersion (945 HP, manufactured by Du Pont-Mitsui Fluorochemicals), were each applied by spin coating to a disk-shaped aluminum (3004) base having a diameter of 360 mm and a thickness of 1.2 mm, dried, and baked at 400° C. to form two different fluorocarbon resin composites each including a PTFE film or a PFA film serving as fluorocarbon resin layer having a thickness of 10 µm on the aluminum base.

ii. Electron Beam Irradiation

Figure 7:
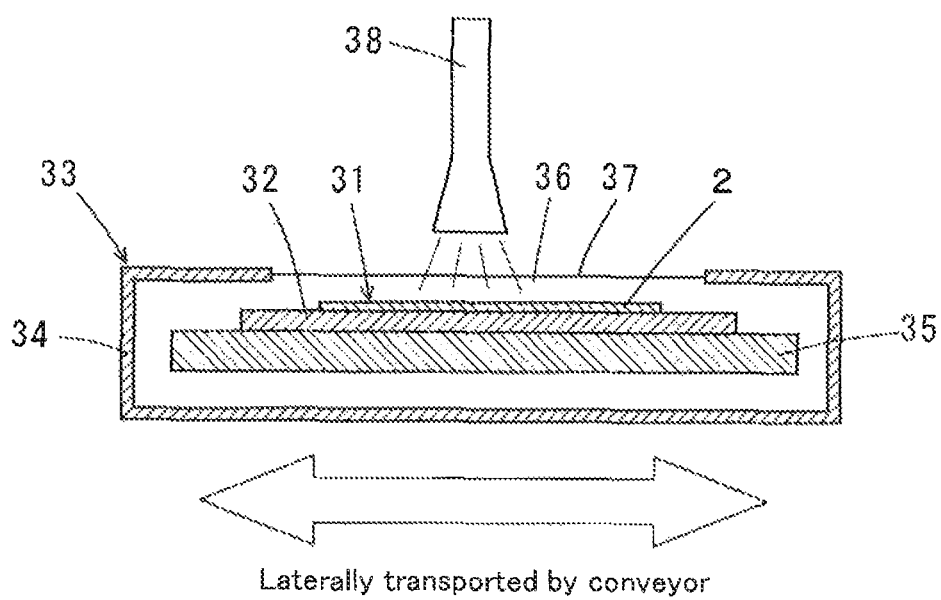
FIG. 7 is a conceptual drawing illustrating a method for irradiating a fluorocarbon resin layer with electron beams according to an example of the present invention.

FIG. 7 is a conceptual drawing showing an electron beam irradiation method. In FIG. 7, the fluorocarbon resin composite 31 including the fluorocarbon resin layer 2 (PTFE or PFA film) facing up and the aluminum base 32 facing down was placed on a hot plate 35 arranged in a chamber 33 for electron beam irradiation. An opening 36 through which electron beams passed was arranged above partition walls 34 of the chamber 33. To seal the chamber 33, the opening 36 was covered with titanium foil 37 with a thickness of 30 µm. The temperature of the hot plate 35 was set to 340° C. for the fluorocarbon resin composite including the PTFE film. The temperature of the hot plate 35 was set to 310° C. for the fluorocarbon resin composite including the PFA layer. The gas in the chamber 33 was replaced with nitrogen (an oxygen concentration in the chamber after replacement of 5 ppm). The layers were irradiated with electron beams at a dose of 60 kGy with a conveyor-type electron beam irradiation system 38 (acceleration voltage: 1.16 MeV, manufactured by NHV Corporation), thereby crosslinking each of PTFE and PFA constituting the fluorocarbon resin layers 2.

iii. Pressing

Each of the samples after electron beam irradiation was cold-stamped into a bowl-shaped article with a die for an inner pot of a rice cooker, thereby forming an inner pot having a depth of 120 mm and a diameter of 190 mm. Although the stamping of each sample into the bowl-shaped article applied stresses, such as pressure, friction, and tension, to the aluminum base 32 and the fluorocarbon resin layer 2, the resulting PTFE and PFA films of the inner pots were free from problems, such as detachment and flaws. The results demonstrated that the PTFE film and the PFA film in this example were able to withstand pressing without performing surface treatment such as etching of the base.

(2) Performance Evaluation
i. Evaluation of Abrasion Resistance

Figure 8:
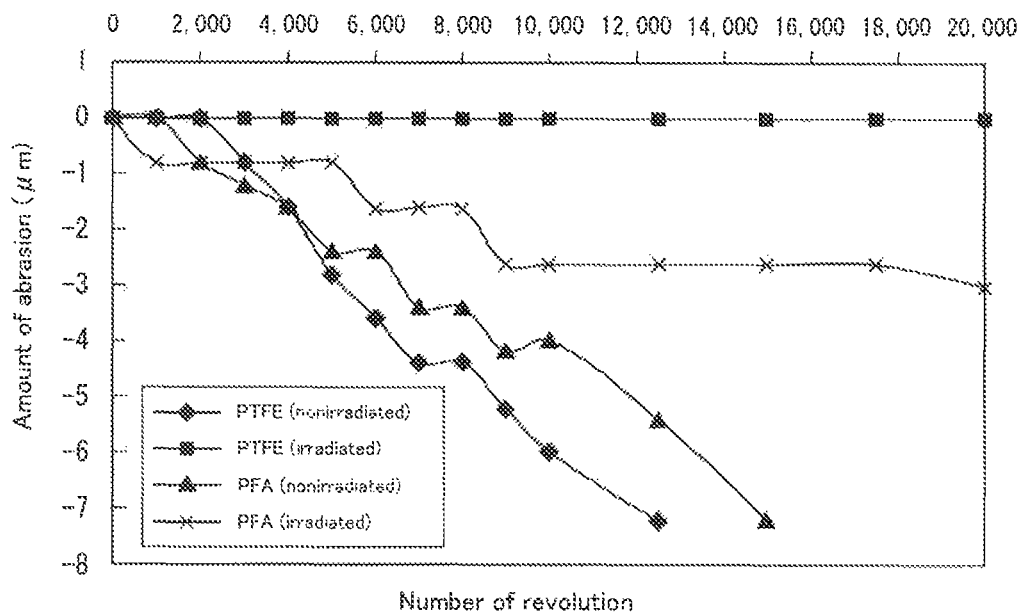
FIG. 8 is a graph showing the evaluation results of abrasion properties of cookware according to an example of the present invention.

The abrasion resistance of each of the resulting PTFE film and the PFA film of the inner pots was evaluated by the Taber's abrasion resistance test. FIG. 8 shows the evaluation results in addition to results in the case where nonirradiated PTFE and PFA films were provided. FIG. 8 demonstrated that the irradiation of radiation resulted in a significant increase in the abrasion resistance of the PTFE and PFA films. Furthermore, in the irradiated PTFE film, surprisingly, the amount of abrasion was zero even after 20,000 revolutions.

ii. Evaluation of Adhesive Strength

The adhesion strength of each of the resulting PTFE film and the PFA film of the inner pots was evaluated by the detachment test, what is called the cross-cut test. The evaluation was made even if the films having flaws and pin holes were subjected to pressing. Thus, 100 cuts were made in each of the PTFE film and the PFA film so as to penetrate to a corresponding one of the bases, thereby forming a grid of 100 squares. Furthermore, two different projections, called Erichsen, having thicknesses of 5 mm and 10 mm were formed in the middle of each sample. The evaluation of the samples was made. A peeling operation was repeated 100 times. Table II shows the test results.

TABLE II

| Material of fluorocarbon resin film | | PTFE | PFA |
|---|---|---|---|
| Erichsen thickness (mm) | 0 | 100/100 | 100/100 |
|  | 5 | 100/100 | 100/100 |
|  | 10 | 100/100 | 100/100 |

* In Table II, numerators are the numbers of undetached squares, and denominators are the numbers of peeling operations.

The results shown in Table II demonstrated that the PTFE film and the PFA film formed in this example were not detached in the test for evaluating the adhesive strength and thus had good adhesive strength.

iii. Performance Evaluation as Cookware

Figure 9:
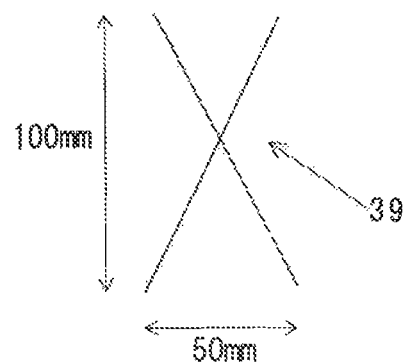
FIG. 9 is a plan view of cuts in a fluorocarbon resin layer of cookware according to an example of the present invention, the cuts penetrating thorough the fluorocarbon resin layer.

An evaluation test in which actual cooking was simulated was performed. Specifically, as shown in FIG. 9, cuts 39 each in the form of an X were made in a PTFE film and a PFA film, each of the cuts 39 having a length of 100 mm and a width of 50 mm and penetrating to a corresponding one of the bases. "Oden No Moto (Soup mix for ODEN)" (registered trademark) manufactured by S & B Foods, Inc. was charged into a rice cooker and boiled for 1000 hours. Then whether the PTFE film and the PFA film were detached from the bases or not was checked. If the adhesion between the bases and the PTFE and PFA films is insufficient, a soup (Oden soup) will penetrate to interfaces between them during boiling to cause detachment of the PTFE film and the PFA film. In this example, however, it was found that no detachment occurred and thus the composites were able to be used as cookware without problems.

3. Second Embodiment

This embodiment is an embodiment according to the second aspect and relates to a roller for use in office automation equipment.

(Production of Roller for Use in Office Automation Equipment)

Figure 10:
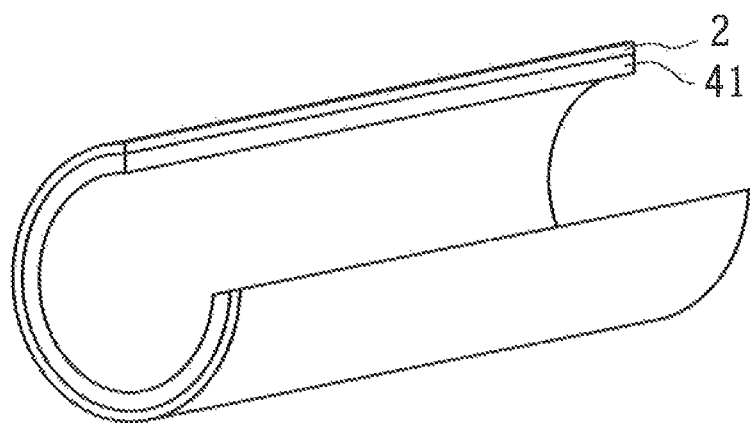
FIG. 10 is a partially cutout conceptual drawing showing a roller for use in office automation equipment according to an embodiment of the present invention.

FIG. 10 is a partially cutout conceptual drawing showing a fixing roller for use in office automation equipment according to the present invention. In FIG. 10, reference numeral 41 denotes a circular base, and reference numeral 2 denotes a thin film-like fluorocarbon resin layer on the circular base 41.

The circular base 41 has a cylindrical shape. A heater (not shown) and so forth are accommodated in the cylinder. Examples of a material constituting the circular base 41 include heat-resistant resins such as polyimide resins and polyamide-imide resins and metals such as stainless steel and aluminum. The fluorocarbon resin layer 2 has a thickness of 15 µm and is crosslinked by electron beam irradiation.

Figure 11:
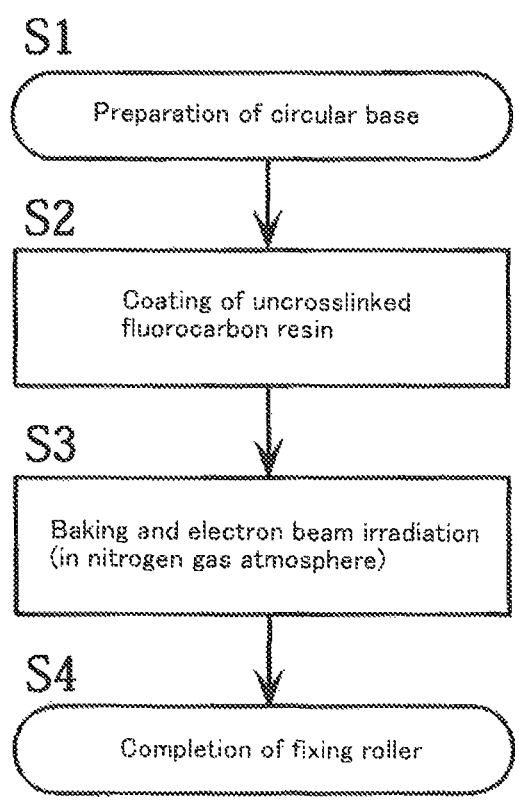
FIG. 11 is a flow chart illustrating a procedure for producing a roller for use in office automation equipment according to an embodiment of the present invention.

The fixing roller having the structure described above is produced in accordance with a flow chart of a production procedure shown in FIG. 11.

First, in step S1, the circular base 41 is prepared. For example, the circular base 41 composed of polyimide is produced by a method described below. That is, polyimide varnish is applied to the outside of a drum-shaped die having a predetermined outer diameter and a predetermined length while the die is being rotated. Then the die is heated to perform imidization, thereby forming the circular base 41 around the die, the circular base 41 having a thickness of about 80 µm and being composed of polyimide.

In step S2, an uncrosslinked fluorocarbon resin 2 (PFA) is applied onto the circular base 41 by a dispersion method or the like to form a thin film. As a material of the fluorocarbon resin 2, PFA (950 HP, manufactured by Du Pont-Mitsui Fluorochemicals) is preferably used. The PFA is composed of a thermoplastic fluorocarbon resin and has a solid content of 33% and a particle size of approximately several tenths of a micrometer; hence, the PFA is suitable for the formation of a thin film by the dispersion method or the like.

In the present invention, an elastic intermediate layer may be formed on the outer surface of the circular base 41, and the fluorocarbon resin 2 may be applied onto the outer surface of the intermediate layer. For example, an intermediate layer composed of synthetic rubber such as silicone rubber and having a thickness of about 200 µm is formed on a surface of the circular base 41 with a dispenser. Then the fluorocarbon resin 2 is applied onto the outside of the intermediate layer.

In step S3, the fluorocarbon resin 2 is heated to 380° C. to melt dispersion particles, thereby forming a film of the fluorocarbon resin 2. Simultaneously, the fluorocarbon resin 2 is subjected to electron beam irradiation in a nitrogen gas atmosphere before the temperature of the fluorocarbon resin 2 is decreased to a temperature equal to or lower than its melting point, thereby crosslinking the fluorocarbon resin 2. Note that the heating temperature is appropriately adjusted in response to a material constituting the base. To sufficiently crosslink the fluorocarbon resin 2, the amount of electron beam irradiation is set to about 100 kGy. An irradiation unit (min-EB, manufactured by Ushio Inc.) is used as an electron beam irradiation apparatus because it is versatile, inexpensive, and compact. In the case where electron beam irradiation is not performed, a primer layer is needed to bond the circular base 41 to the fluorocarbon resin layer 2. In the method according to the present invention, strong bonding can be achieved by electron beam irradiation without using the primer layer.

In step S4, the fluorocarbon resin 2 is cooled, resulting in the fixing roller. The abrasion resistance of the fluorocarbon resin layer 2 of the resulting fixing roller is evaluated by the Taber's abrasion resistance test. The adhesive strength between the circular base 41 and the fluorocarbon resin layer 2 is evaluated by the peeling test. In both cases, whether the results meet predetermined criteria is checked. An example of another method for evaluating abrasion resistance is a linear reciprocating wear test (test temperature: 250° C.).

4. Third Embodiment

This embodiment is an embodiment according to the second aspect and relates to a roller for use in office automation equipment.
(Production of Roller for Use in Office Automation Equipment)

Figure 12:
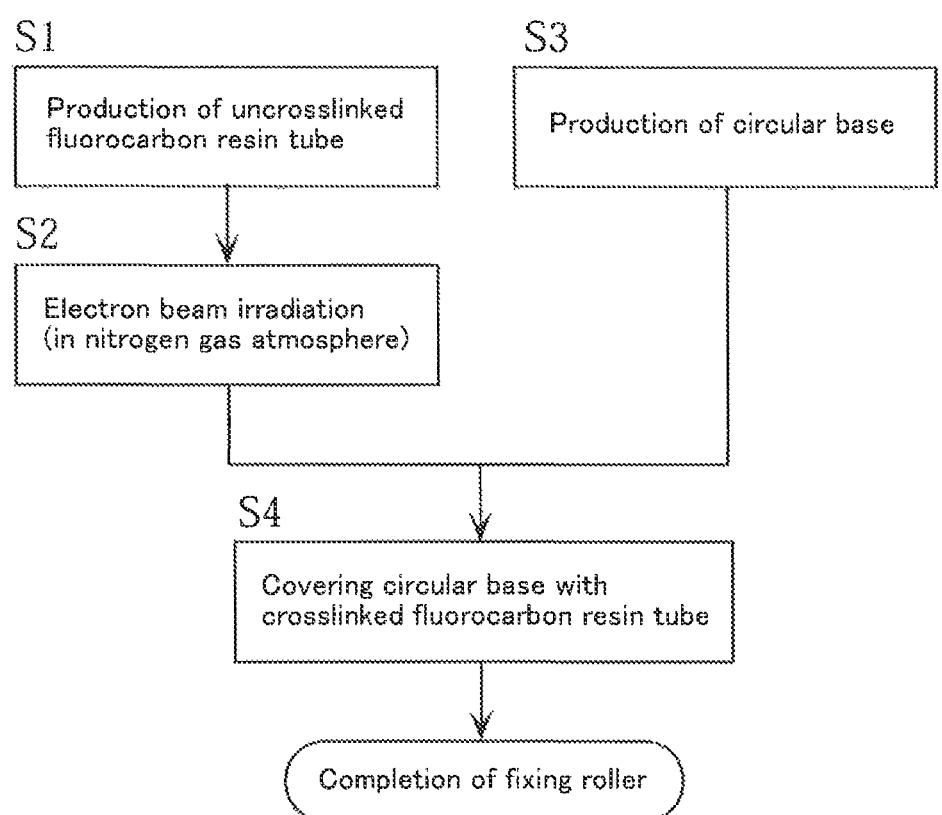
FIG. 12 is a flow chart illustrating another procedure for producing a roller for use in office automation equipment according to an embodiment of the present invention.

FIG. 12 is a flow chart illustrating another procedure for making a fixing roller.

Figure 13:
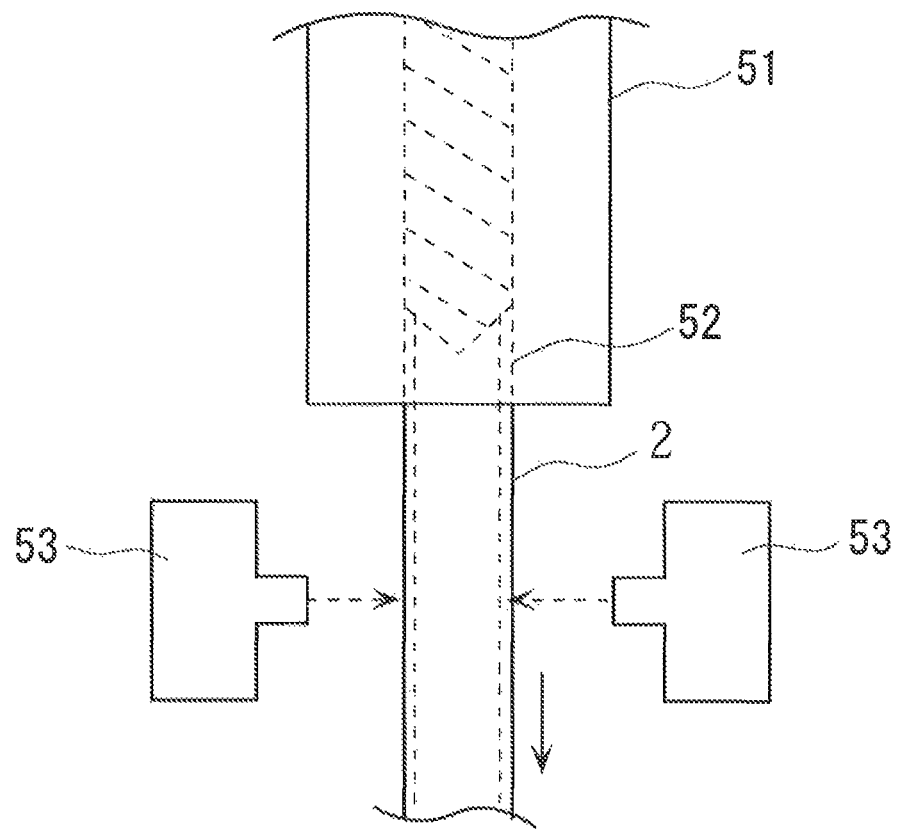
FIG. 13 is a conceptual partially cross-sectional view illustrating a production process of a roller for use in office automation equipment according to an embodiment of the present invention.

In step S1, an uncrosslinked fluorocarbon resin (PFA) tube is produced with an upright extruder shown in FIG. 13. In FIG. 13, reference numeral 2 denotes a fluorocarbon resin (PFA) tube, reference numeral 51 denotes a die (outlet) of the extruder, and reference numeral 53 denotes an electron beam irradiation apparatus 53. The die 51 is surrounded by a nitrogen gas atmosphere.

A molten uncrosslinked fluorocarbon resin (PFA) obtained by heating fluorocarbon resin pellets (PFA, 950 HP) to a temperature equal to or higher than its melting point is fed into the die 51 of the upright extruder. A ring-shaped opening 52 is arranged at the lower end of the die 51. The molten uncrosslinked fluorocarbon resin is extruded from the opening 52 in a downward direction to form the uncrosslinked fluorocarbon resin tube 2.

In step S2, the downwardly extruded fluorocarbon resin tube 2 is subjected to electron beam irradiation in a nitrogen gas atmosphere with the electron beam irradiation apparatus 53 arranged in a circular pattern and below the extruder before the temperature is decreased to a temperature equal to or lower than its melting point, thereby crosslinking the resin. The foregoing irradiation unit (min-EB, manufactured by Ushio Inc.) is used as the electron beam irradiation apparatus 53. To sufficiently crosslink the fluorocarbon resin tube 2, the amount of electron beam irradiation is preferably about 100 kGy. The crosslinked fluorocarbon resin tube 2 is cut into a predetermined length.

In step S3, the circular base 41 is produced. For example, polyimide varnish is applied to the outside of a drum-shaped die having a predetermined outer diameter and a predetermined length while the die is being rotated. Then the die is heated to perform imidization, thereby forming the circular base 41 having a thickness of about 80 µm and being composed of polyimide.

In step S4, the outer surface of the circular base 41 is covered with the fluorocarbon resin tube 2 serving as the fluorocarbon resin layer 2. An example of a covering method is a method including applying a viscous adhesive to the outer peripheral surface of the circular base 41 and then forcedly sliding the fluorocarbon resin tube 2 over the circular base. Another example thereof is a method using a heat-shrinkable fluorocarbon resin tube as the fluorocarbon resin tube 2, the method including inserting the circular base 41 into the fluorocarbon resin tube 2 and then allowing the fluorocarbon resin tube 2 to shrink by heating the fluorocarbon resin tube 2, thereby bonding the outer peripheral surface of the circular base 41 to the inner peripheral surface of the fluorocarbon resin tube 2.

In this way, the fixing roller including the thin fluorocarbon resin layer 2 on the circular base 41 is completed by extrusion suitable for mass production.

5. Fourth Embodiment

This embodiment is an embodiment according to the second aspect and relates to a roller for use in office automation equipment.
(Production of Roller for Use in Office Automation Equipment)

Figure 14:
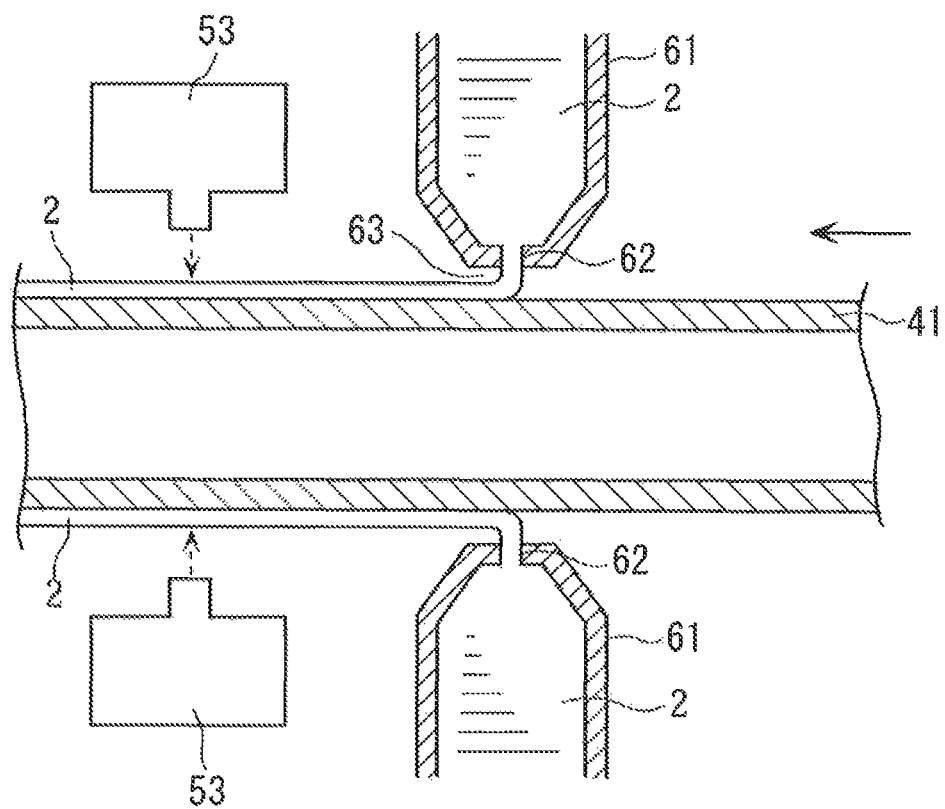
FIG. 14 is a conceptual partially cross-sectional view illustrating another production process of a roller for use in office automation equipment according to an embodiment of the present invention.

FIG. 14 is a conceptual partially cross-sectional view illustrating a method for producing a fixing roller by another extrusion. In FIG. 14, reference numeral 41 denotes the circular base, reference numeral 61 denotes a die (outlet) of an extruder, and reference numeral 53 denotes the electron beam irradiation apparatus 53. The die 61 of the extruder has a hole 63 with a diameter slightly larger than that of the circular base 41. As described below, the circular base 41 passes through the hole 63. An opening 62 of the die 61 arranged in a circular pattern is located in the inner peripheral wall of the hole 63. The molten uncrosslinked fluorocarbon resin (PFA) 2 that is heated to its melting point or higher is fed into the die 61. The die 61 is surrounded by a nitrogen gas atmosphere.

The electron beam irradiation apparatus 53 is arranged in a circular pattern and behind the extruder. The foregoing irradiation unit (min-EB, manufactured by Ushio Inc.) is used as the electron beam irradiation apparatus 53.

When the circular base 41 transported from the direction indicated by an arrow passes through the hole 63 of the extruder, the molten uncrosslinked fluorocarbon resin (PFA) 2 heated to its melting point or higher is extruded from the opening 62 of the die 61 so as to be uniformly applied to the outer peripheral surface of the circular base 41.

The circular base 41 provided with the fluorocarbon resin 2 on its outer peripheral surface is further transported. The fluorocarbon resin 2 is subjected to electron beam irradiation with the electron beam irradiation apparatus 53 in a nitrogen gas atmosphere at a position where the electron beam irradiation apparatus 53 is arranged before the temperature of the fluorocarbon resin 2 is decreased to a temperature equal to or lower than its melting point, thereby crosslinking the fluorocarbon resin 2. To sufficiently crosslink the fluorocarbon resin 2, the amount of electron beam irradiation is preferably about 100 kGy.

Hereafter, the fluorocarbon resin 2 is cooled, resulting in the fixing roller. In this way, the thin fluorocarbon resin layer 2 is formed on the circular base 41 by extrusion suitable for mass production.

6. Fifth Embodiment

This embodiment is an embodiment according to the second aspect and relates to a belt for use in office automation equipment.
(Production of Belt for Use in Office Automation Equipment)

Figure 15:
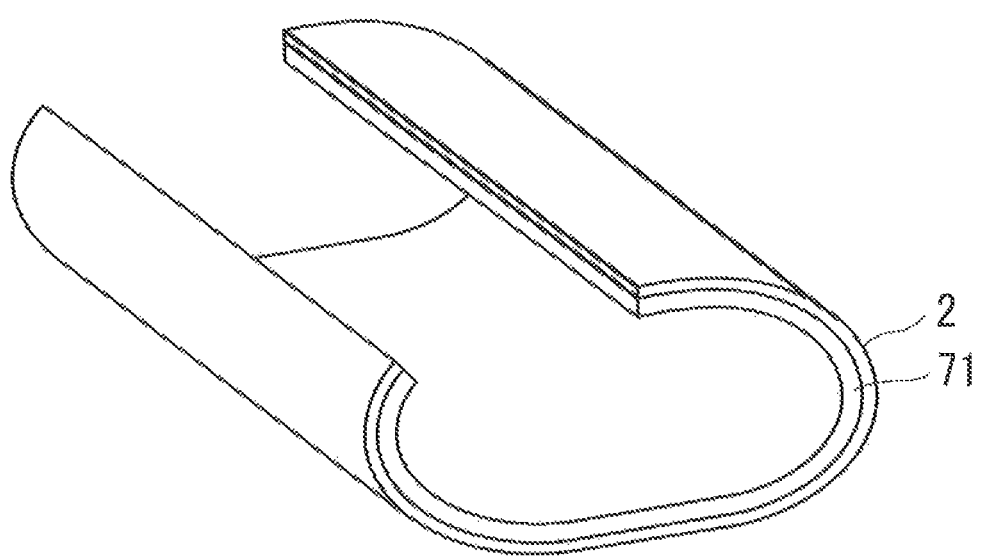
FIG. 15 is a partially cutout conceptual drawing of a belt for use in office automation equipment according to an embodiment of the present invention.

FIG. 15 is a partially cutout conceptual drawing showing a transfer belt (or transfer fixing belt) for use in office automation equipment according to the present invention. In FIG. 15, reference numeral 71 denotes a circular base 71, and reference numeral 2 denotes a thin film-like fluorocarbon resin layer on the circular base 71.

The circular base 71 has a strip-like shape. In the case of using the circular base 71 as a belt, a heater and so forth are accommodated in the inside. Examples of a material constituting the circular base 71 include heat-resistant resins such as polyimide resins and polyamide-imide resins and metals such as stainless steel and aluminum.

The fluorocarbon resin layer 2 has a thickness of 10 μm and is crosslinked by electron beam irradiation. As a material of the fluorocarbon resin layer 2, PFA (950 HP, manufactured by Du Pont-Mitsui Fluorochemicals) is preferably used. The PFA is composed of a thermoplastic fluorocarbon resin and has a solid content of 33% and a particle size of about 0.2 Gm; hence, the PFA is suitable for the formation of a thin film by the dispersion method or the like.

7. Sixth Embodiment

This embodiment is an embodiment according to the second aspect and relates to a belt for use in office automation equipment.
(Production of Belt for Use in Office Automation Equipment)

Figure 16:
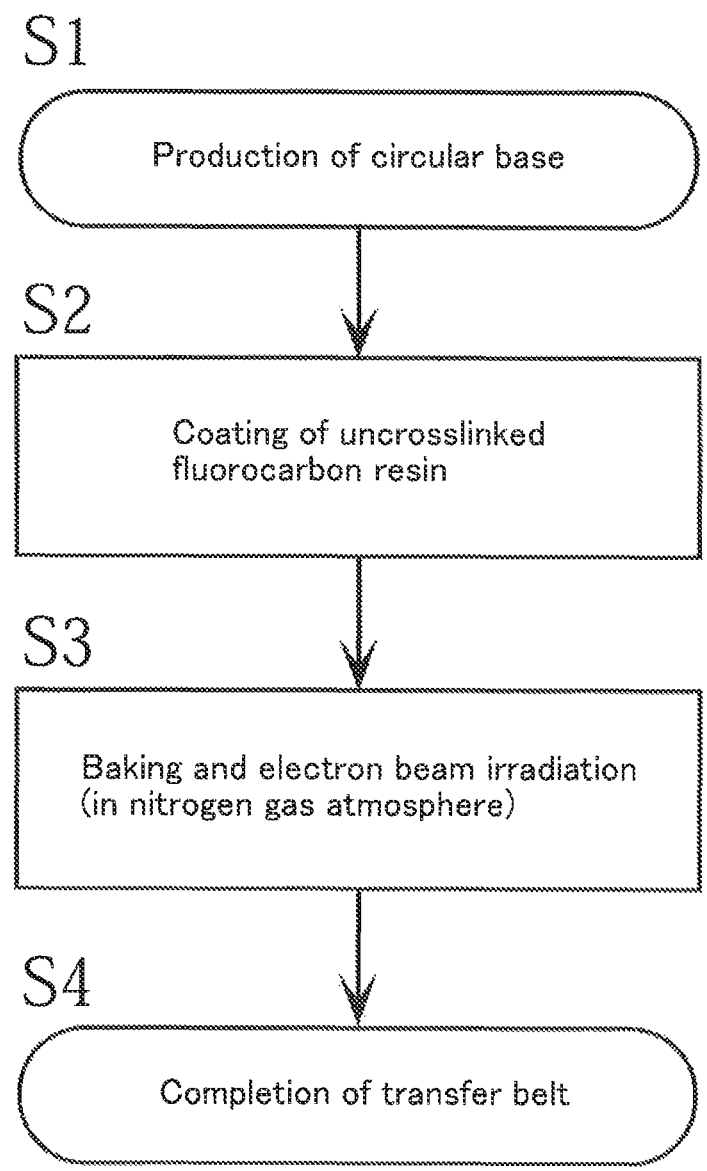
FIG. 16 is a flow chart illustrating a procedure for producing a belt for use in office automation equipment according to an embodiment of the present invention.

The transfer belt (or transfer fixing belt) shown in FIG. 15 is produced by, for example, in accordance with a flow chart of a production procedure shown in FIG. 16. In step S1, the circular base 71 is produced. For example, the circular base 71 composed of polyimide is produced by a method described below. That is, polyimide varnish is applied, and then a die is heated to perform imidization, thereby forming the circular base 71 around the die, the circular base 71 having a thickness of about 80 μm and being composed of polyimide. In the present invention, an elastic intermediate layer may be formed on the outer surface of the circular base 71, and the fluorocarbon resin 2 may be applied onto the outer surface of the intermediate layer. For example, an intermediate layer composed of synthetic rubber such as silicone rubber and having a thickness of about 200 μm is formed on a surface of the circular base 71 with a dispenser.

In step S2, an uncrosslinked fluorocarbon resin (PFA) dispersion is applied to form a thin film composed of the fluorocarbon resin on the circular base 71.

In step S3, the powdery fluorocarbon resin is melted by heating (heating temperature: 380° C.) to form a uniform thin film. Simultaneously, the fluorocarbon resin is subjected to electron beam irradiation in a nitrogen gas atmosphere before the temperature of the fluorocarbon resin is decreased to a temperature equal to or lower than its melting point, thereby crosslinking the fluorocarbon resin. To sufficiently crosslink the fluorocarbon resin, the amount of electron beam irradiation is set to about 100 kGy. An irradiation unit (min-EB, manufactured by Ushio Inc.) is used as an electron beam irradiation apparatus because it is versatile, inexpensive, and compact.

In step S4, the fluorocarbon resin is cooled. At this time, if the fluorocarbon resin is rapidly cooled, the crystallization of the fluorocarbon resin does not easily occur, thus improving the flex resistance of the fluorocarbon resin layer 2. Furthermore, the use of a side-chain-type fluorocarbon resin suppresses crystallization and is thus preferred. Moreover, the use of a fluorocarbon resin having a higher molecular weight improves flex resistance and is thus preferred. Note that each of the circular base, the silicone rubber, and the fluorocarbon resin is adjusted by carbon conduction or ionic conduction so as to have a volume resistivity of about $10^{11}$ Ω·cm. Thereby, the transfer fixing belt is completed. The abrasion resistance of the fluorocarbon resin layer 2 of the resulting transfer belt is evaluated by the Taber's abrasion resistance test. The adhesive strength between the circular base 71 and the fluorocarbon resin layer 2 is evaluated by the cross-cut test (JIS-K-5400, 1998 edition). In both cases, whether the results meet predetermined criteria is checked. As another method for evaluating abrasion resistance, the foregoing linear reciprocating wear test (test temperature: 250° C.) may be available.

8. Seventh Embodiment

This embodiment is an embodiment according to the second aspect and relates to a belt for use in office automation equipment.

Figure 17:
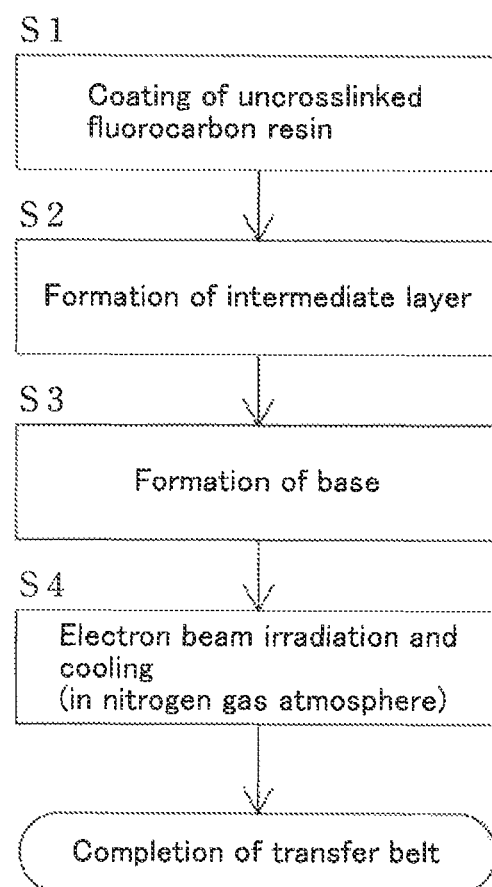
FIG. 17 is a flow chart illustrating another procedure for producing a belt for use in office automation equipment according to an embodiment of the present invention.

The transfer belt shown in FIG. 15 is also produced in accordance with a flow chart of a production procedure shown in FIG. 17. In step S1, a dispersion of a fine powder composed of an uncrosslinked fluorocarbon resin (PFA) dispersed in water is applied to a ring-shaped stainless-steel die (cylinder) having a mirror-polished inner peripheral surface by dipping and baked at 380° C., thereby forming a thin film (with a thickness of about 10 μm) of the uncrosslinked fluorocarbon resin on the inner peripheral surface of the ring-shaped die.

In step S2, an intermediate layer is formed. For example, the ring-shaped die provided with the fluorocarbon resin layer on its inner peripheral surface is placed in a plasma processing chamber. A counter electrode is arranged inside the ring-shaped die so as to face the ring-shaped die. The plasma processing chamber is filled with a He atmosphere. A high-frequency power having predetermined output, voltage, and frequency is applied to the counter electrode and the ring-shaped die also functioning as an electrode for plasma generation. This generates a plasma in a gap between the ring-shaped die and the counter electrode, so that the inner peripheral surface of the fluorocarbon resin layer is subjected to plasma treatment.

After the treatment such as plasma treatment of the inner peripheral surface of the fluorocarbon resin layer, primers 101A and 101B (manufactured by Shin-Etsu Chemical Co.) are mixed in a ratio of 1:1. The resulting mixture is applied to the inner peripheral surface of the fluorocarbon resin and dried to form an adhesive film having a thickness of about 5 μm. Then silicone rubbers KE-1370A and KE-1370B (manufactured by Shin-Etsu Chemical Co.) are mixed in a ratio of 1:1. The viscosity of the mixture is adjusted using a solvent. The mixture is applied to the adhesive film and cured at 150° C., thereby forming the intermediate layer having a thickness of about 200 μm.

In step S3, a circular base is formed. For example, the inner peripheral surface of the intermediate layer is subjected to plasma treatment in the same way as the plasma treatment of the fluorocarbon resin layer. A thermoplastic polyimide (Rikacoat PN-20, manufactured by New Japan Chemical Co., Ltd.) is applied and dried at 220° C., thereby forming the circular base 71 having a thickness of about 80 μm. Then the circular base, the intermediate layer, and the fluorocarbon resin layer are pulled out from the die, thereby affording a circular belt including the circular base 71, the intermediate layer 72, and the fluorocarbon resin layer 2 (surface layer) shown in FIGS. 18(A) and 18(B). Note that each of the surface layer (fluorocarbon resin layer), the adhesive layer (primer layer), the elastic layer (silicone rubber layer), and the base (polyimide layer) is adjusted by carbon conduction or ionic conduction so as to have a volume resistivity of about $10^{11}$ Ω·cm.

Figure 18:
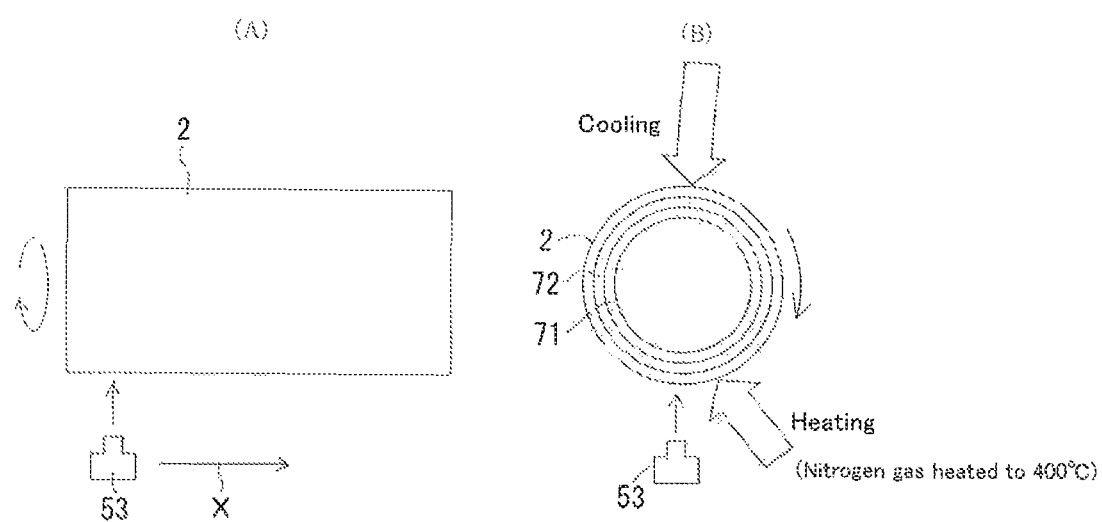
FIG. 18(A) is a conceptual front view and FIG. 18(B) is a conceptual side view, both views illustrating a method of electron beam irradiation in the production of a belt for use in office automation equipment according to an embodiment of the present invention.

In step S4, after a core is inserted into a hollow portion of the circular belt, the circular belt is rotated as shown in FIG. 18. Nitrogen gas heated to 400° C. is blown on the surface layer of the circular belt, increasing the temperature of the fluorocarbon resin layer 2 to a temperature equal to or higher than its melting point. Then Electron beam irradiation is performed, resulting in the crosslinked fluorocarbon resin layer 2. That is, the entire fluorocarbon resin layer 2 is uniformly subjected to electron beam irradiation while the circular belt provided with the fluorocarbon resin layer 2, which is a target irradiated, on its outer peripheral surface is being rotated and while the electron beam irradiation apparatus 53 arranged outside the circular belt is being translated in the x direction indicated by an arrow (that is, spiral irradiation). To sufficiently crosslink the fluorocarbon resin layer 2, the amount of electron beam irradiation is preferably about 100 kGy. The foregoing irradiation unit (min-EB, manufactured by Ushio Inc.) is used as the electron beam irradiation apparatus 53. A cooling point is set at a position located 180 degrees apart from a heating point. Rapid cooling is performed so as not to degrade the intermediate layer 72 before the temperature of the intermediate layer 72 located under the fluorocarbon resin layer 2 reaches the decomposition temperature. Rapid cooling also improves the flex resistance of the fluorocarbon resin layer 2.

In this way, the transfer belt including the circular base 71, the intermediate layer 72, and the fluorocarbon resin layer 2 is completed by the production process suitable for mass production.

The invention claimed is:

1. A method for producing a roller or a belt for use in office automation equipment, comprising the steps of placing a die of an extruder in a nitrogen gas atmosphere; extruding an uncrosslinked fluorocarbon resin from the die of the extruder onto a cylindrical base; and subjecting the fluorocarbon resin to electron beam irradiation in the nitrogen gas atmosphere to crosslink the fluorocarbon resin before the temperature of the fluorocarbon resin is decreased to a temperature equal to or lower than the melting point of the fluorocarbon resin.

2. The method for producing a roller or a belt for use in office automation equipment according to claim 1, further comprising after the uncrosslinked fluorocarbon resin is heated to a temperature equal to or higher than the melting point of the fluorocarbon resin and then subjected to electron beam irradiation in a nitrogen gas atmosphere to crosslink the fluorocarbon resin, performing rapid cooling before the temperature of a layer located below the fluorocarbon resin reaches the decomposition temperature of the layer.

* * * * *